United States Patent
Gotoh

(10) Patent No.: US 8,036,780 B2
(45) Date of Patent: Oct. 11, 2011

(54) FLOW CONTROLLER AND TEST METHOD THEREFOR, AND FLOW CONTROL METHOD

(75) Inventor: Takao Gotoh, Mie-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 377 days.

(21) Appl. No.: 12/413,179

(22) Filed: Mar. 27, 2009

(65) Prior Publication Data

US 2009/0248213 A1 Oct. 1, 2009

(30) Foreign Application Priority Data

Mar. 31, 2008 (JP) ................................. 2008-090430

(51) Int. Cl.
- *G05D 7/00* (2006.01)
- *G05D 11/00* (2006.01)
- *G05D 7/03* (2006.01)
- *G01F 1/12* (2006.01)

(52) U.S. Cl. ............... 700/282; 702/100; 702/98; 137/2
(58) Field of Classification Search .................. 700/282; 702/45, 85, 98, 100; 137/12
See application file for complete search history.

(56) References Cited

U.S. PATENT DOCUMENTS

| | | | | |
|---|---|---|---|---|
| 7,243,052 B2 * | 7/2007 | Friman | ........................ | 702/199 |
| 2007/0198131 A1 * | 8/2007 | Tokuhisa et al. | .............. | 700/282 |
| 2007/0233412 A1 * | 10/2007 | Gotoh et al. | .................. | 702/100 |
| 2008/0183310 A1 * | 7/2008 | Dykstra | .......................... | 700/29 |
| 2008/0183336 A1 * | 7/2008 | Dykstra | ........................ | 700/282 |

FOREIGN PATENT DOCUMENTS

| JP | 2006-038832 A | 2/2006 |
|---|---|---|
| JP | 2006038832 | * 2/2006 |

\* cited by examiner

*Primary Examiner* — Kakali Chaki
*Assistant Examiner* — Sivalingam Sivanesan
(74) *Attorney, Agent, or Firm* — Arent Fox LLP

(57) ABSTRACT

A flow controller and a test method therefor are provided which enable testing of the flow control of a process gas passing through a fluid path during operation of semiconductor manufacturing apparatuses. While the flow control is being performed to adjust the flow rate through the fluid path to a flow rate set value, a predetermined number of pieces of test sampling information is collected and associated with the flow rate set value for storage. The test sampling information is made up of a detected flow rate value of the process gas, a detected pressure value, and valve drive control information delivered to a flow control valve mechanism. Then, coefficients of association are sequentially determined which indicate the associations of the predetermined number of detected flow rate values and pieces of valve drive control information, which are stored as the test sampling information. When the value of a coefficient of association is out of the range of predetermined threshold values, a difference is determined between the valve drive control information made available based on a newly received detected flow rate value and the reference valve drive control information obtained with reference to a valve property information table pre-registered for testing. This difference is employed as test information.

24 Claims, 14 Drawing Sheets

| REFERENCE FLOW RATE (Rs) (cc/min) | REFERENCE VALVE DRIVE CONTROL INFORMATION (Vs) | | | |
|---|---|---|---|---|
| | REFERENCE FLUID PRESSURE VALUE (Ps) | | | |
| | 0.05MPa | 0.1MPa | 0.2MPa | 0.3MPa |
| 5 | 27.352 V | 24.759 V | 20.152 V | 18.654 V |
| 10 | 37.157 | 30.055 | 26.456 | 22.552 |
| ⁝ | ⁝ | ⁝ | ⁝ | ⁝ |
| 55 | 63.850 | 57.403 | 52.653 | 48.803 |
| 60 | 64.803 | 59.308 | 53.609 | 49.906 |
| 65 | | | | |
| ⁝ | ⁝ | ⁝ | ⁝ | ⁝ |
| 95 | 72.104 | 68.600 | 63.251 | 58.001 |
| 100 | 74.613 | 68.6261 | 64.253 | 58.853 |

(VALVE PROPERTY INFORMATION TABLE)

FIG.7

FLOW RATE SET VALUE (60cc/min)    K2

| FLOW RATE SET VALUE IDENTIFICATION INFORMATION | TEST SAMPLING INFORMATION | | |
|---|---|---|---|
| | VALVE DRIVE CONTROL INFORMATION (V1) | DETECTED FLOW RATE VALUE (R1) | DETECTED PRESSURE VALUE (P1) |
| R60-1 | 53.610 | 60.005 | 0.195 |
| R60-2 | 53.615 | 60.009 | 0.200 |
| R60-3 | | | |
| | | | |
| | | | |
| R60-n | | | |

(TEST INFORMATION SAMPLING TABLE)

FIG.8

FLOW RATE SET VALUE (20cc/min)    K3

| FLOW RATE SET VALUE IDENTIFICATION INFORMATION | TEST SAMPLING INFORMATION | | |
|---|---|---|---|
| | VALVE DRIVE CONTROL INFORMATION (V1) | DETECTED FLOW RATE VALUE (R1) | DETECTED PRESSURE VALUE (P1) |
| R20-1 | 30.010 | 20.001 | 0.200 |
| R20-2 | 30.015 | 20.004 | 0.202 |
| R20-3 | | | |
| | | | |
| | | | |
| R20-n | | | |

(TEST INFORMATION SAMPLING TABLE)

FLOW CONTROLLER AND TEST METHOD THEREFOR, AND FLOW CONTROL METHOD

BACKGROUND OF THE INVENTION

The present invention relates to a flow controller for controlling comparatively low flow rates of a fluid passing through fluid paths such as pipelines, a method for testing the accuracy of the flow control provided by the flow controller to control the flow rate through the fluid path, and a flow control method.

Various types of semiconductor products or electronic components are manufactured, for example, by placing wafers in a chamber of a CVD (Chemical Vapor Deposition) apparatus and then supplying into this chamber a process gas that contains raw materials and chemically reactive substances necessary for deposition, thereby fabricating semiconductor integrated circuits on the surface of the wafers. The raw material gas used includes, for example, $SiH_4$, $WF_6$, and $NH_3$. In addition, etching gases for use in etching after deposition include, for example, $CH_4$ or $Cl_2$.

Recently, there has been increasing demand for further reduction in size and higher functionality of semiconductor products and electronic components, which has led to semiconductor integrated circuits formed on wafers using finer design rules. Accordingly, those semiconductor integrated circuits would likely degrade in quality unless precise and high-speed control is performed on the flow rate of a process gas supplied to the semiconductor manufacturing apparatus such as a CVD apparatus. On the other hand, since semiconductor manufacturing lines involving manufacturing apparatuses such as a CVD apparatus require a significant capital investment, there has also been a strong demand for improvement in the rate of operation of the semiconductor manufacturing apparatuses.

To supply the process gas into such a semiconductor manufacturing apparatus at flow rates with high accuracy, it has been conventionally practiced to provide a mass flow controller in a pipeline (fluid path), through which the process gas passes, in order to regulate the flow rate of the process gas to a target value.

Conventionally employed mass flow controllers (hereinafter referred to as the "flow controller") includes a flow rate sensor for measuring the flow rate through a fluid path and a flow control valve mechanism for regulating the flow rate through the fluid path. The flow controller also includes a controller for controlling the valve opening of this flow control valve mechanism so that the flow rate is regulated to a target flow rate value (hereinafter referred to as the "flow rate set value") specified by an external system or the like. Furthermore, this controller computes the amount of difference (the amount of deviation) between the detected flow rate value received from the flow rate sensor and the flow rate set value. Then, to regulate the flow rate through the fluid path to the specified flow rate set value based on the amount of deviation, the controller delivers the amount of control (control signal) determined by PID operation to the flow control valve mechanism and hence regulates its valve opening, thereby providing control to adjust the flow rate to the flow rate set value.

The flow controller configured in this manner is required to perform flow control to make the flow rate through the fluid path coincide with the flow rate set value with high accuracy. This flow rate set value is specified, for example, using a flow rate setting signal, from an upper-class control system (external system) which collectively controls and monitors the operation of the semiconductor manufacturing line. However, with the various types of apparatus and the flow controller, including the semiconductor manufacturing apparatuses, constituting the semiconductor manufacturing line, there may occur changes in performance (hereinafter referred to as the "equipment aging"). The equipment aging refers to the phenomenon in which there occur slight changes in performance or characteristics of each member constituting the apparatus, due to adhesion of foreign substances. The equipment aging also refers to degradation in performance or characteristics of the members themselves over time from the start of operation of the manufacturing line.

More specifically, the equipment aging can be caused, for example, by adhesion of chemical products to the inside of a pipeline through which the process gas is supplied, by adhesion of chemical products to sensor pipes or bypass pipes constituting the flow rate sensor, or by degradation in performance of an actuator installed in the flow control valve mechanism. Once such equipment aging occurs, there would likely occur a slight difference in the valve opening with respect to the one initially available. This may happen even if the same valve drive control information (for example, valve drive voltage) as that initially employed at the time of introduction of the semiconductor manufacturing apparatus is delivered (applied) to the actuator included in the flow control valve mechanism of the flow controller. As a result, even if the flow controller provides control to adjust the flow rate through the fluid path to the flow rate set value, there will be found a deviation between the actually controlled flow rate and the flow rate set value.

Those problems concerned with such equipment aging have been addressed conventionally. To this end, the relevant semiconductor manufacturing apparatus has been stopped periodically or non-periodically to determine whether the flow controller installed in the fluid path can provide flow rate control as designed, i.e., to perform the operation of testing the accuracy of the flow control.

For example, the operation of testing the flow rate was carried out as follows.

A test tank having a known capacity was installed in the fluid path (pipeline) which was located upstream of the flow controller and through which a process gas was supplied. Subsequently, the process gas was allowed to flow stably through the fluid path at a predetermined flow rate and fill in the test tank, and thereafter, the supply of the gas was stopped. Then, the pressure of the gas accumulated within the test tank was measured at predetermined time intervals when the gas flew out towards the downstream side of the fluid path, thereby determining information (H1) regarding changes in the resulting gas pressure over time. Subsequently, the resulting time-dependent information (H1) was compared with time-dependent information (H0) regarding the gas pressure which was obtained in the same manner as described above through the measurement conducted initially upon introduction of the flow controller into the manufacturing line, thereby determining the amount of deviation between them. Then, this amount of deviation was analyzed to correct data regarding flow control, such as a reference voltage value (the valve drive control information), which was then delivered to the actuator of the flow control valve mechanism for flow rate control.

An example of such a flow controller that includes the function of testing flow rates is suggested in the invention disclosed in Japanese Patent Application Laid-Open No. 2006-38832, listed below, which was previously filed by the same applicant.

In Japanese Patent Application Laid-Open No. 2006-38832, a flow controller was suggested which was provided with a test valve for opening or closing the fluid path, a test tank having a predetermined capacity, and pressure detection means for detecting the pressure of a fluid passing through the fluid path and delivering the resulting pressure detection signal. The flow controller also included test control means that uses the test valve, the test tank, and the pressure detection means to control the flow rate test operation.

The flow controller disclosed in Japanese Patent Application Laid-Open No. 2006-38832 performs the flow rate test operation for the flow controller as follows. Namely, control can be performed on the current flow rate through the fluid path without removing the flow controller from the pipeline coupled to the semiconductor manufacturing apparatus. More specifically, it is possible to test the amount of deviation obtained by a comparison between the current flow rate and the initial flow rate determined at the time of installation of the flow controller in the manufacturing line. Then, based on this test result, the control data serving as a reference for flow rate control can be corrected. However, to perform this testing operation, it was inevitable to stop the operation of the semiconductor manufacturing apparatus. In other words, this test operation could not be performed while the semiconductor manufacturing apparatus, for example, a CVD apparatus was being used for deposition on wafers. Furthermore, to implement the flow rate test operation, not only the operation of the semiconductor manufacturing apparatus was required to stop but also a separate discharge gas line was required, in addition to the fluid path through which the process gas was supplied, to discharge the process gas out of the fluid path for the test operation.

SUMMARY OF THE INVENTION

It is therefore an object of the present invention to provide a flow controller to be installed in a fluid path such as a gas pipe through which a process gas is supplied to the semiconductor manufacturing apparatus. The flow controller is capable of performing a function for testing the accuracy of flow control in consideration of the equipment aging, without removing the flow controller from the gas pipe even during the operation of the semiconductor manufacturing apparatus. It is another object of the invention to provide a test method for the flow controller. It is still another object of the invention to provide a method for controlling the flow rate through the fluid path.

According to a first aspect of the present invention, there is provided a flow controller comprising: flow rate detection means for detecting a flow rate of a fluid passing through a fluid path; a flow control valve mechanism, provided in the fluid path, for controlling the flow rate by regulating valve opening in accordance with valve drive control information; and control means for receiving at least one type of a flow rate set value from an external system and delivering the valve drive control information to the flow control valve mechanism to control the valve opening so as to adjust the flow rate through the fluid path to the received flow rate set value.

When the fluid is allowed to flow through the fluid path in advance to deliver the valve drive control information serving as a reference to the flow control valve mechanism, information indicative of a relationship between the reference valve drive control information and a detected flow rate value serving as a reference and detected by the flow rate detection means is associated with a detected pressure value of the fluid and stored as valve property information in storage means of the control means.

When the control means is receiving a new flow rate set value (R0) from the external system, and delivering to the flow control valve mechanism the valve drive control information determined based on a detected flow rate value received from the flow rate detection means at predetermined time intervals, thereby providing a control to adjust the flow rate to the flow rate set value (R0).

The control means comprises:

test information sampling means for allowing test sampling information to be associated with the flow rate set value (R0) and stored in the storage means, the test sampling information including, for each of the newly received flow rate set values (R0) the detected flow rate value (R1) received from the flow rate detection means; a detected pressure value (P1) of the fluid made available upon receiving the detected flow rate value (R1); and valve drive control information (V1) determined based on the detected flow rate value (R1) and delivered to the flow control valve mechanism;

valve control information gradient computation means for sequentially determining, in relation to a predetermined number of pieces of the test sampling information associated with the flow rate set value (R0) and stored in the storage means, a coefficient of association (A) from the detected flow rate value (R1) and the valve drive control information (V1) corresponding to each other in their temporal sequence of storage, the coefficient of association (A) indicating an association of the detected flow rate value (R1) and the valve drive control information (V1) constituting the test sampling information; and flow rate test means for determining a valve control difference as test information on flow control after executing the valve control information gradient computation means, the valve control difference being a difference between new valve drive control information (V1) determined based on a newly received detected flow rate value (R1) and valve drive control information serving as a reference, the valve drive control information being determined with reference to the valve property information and associated with both the newly received detected flow rate value (R1) and a newly received detected pressure value (P1).

According to a second aspect of the present invention, the valve control information gradient computation means comprises first gradient computation means for determining the coefficient of association (A) as a gradient of a straight line connecting between intersection point coordinates defined by associating the detected flow rate value (R1) and the valve drive control information (V1) in their temporal sequence of storage with two-dimensional coordinate axes, respectively, the detected flow rate value (R1) and the valve drive control information (V1) constituting the test sampling information associated with any two types of the flow rate set value.

According to a third aspect of the present invention, the valve control information gradient computation means comprises second gradient computation means for determining the coefficient of association (A) as a gradient of a straight line connecting between origin coordinates and intersection point coordinates defined by associating the detected flow rate value (R1) and the valve drive control information (V1) in their temporal storage sequence with two-dimensional coordinate axes, respectively, the detected flow rate value (R1) and the valve drive control information (V1) constituting the test sampling information associated with any one type of the flow rate set value.

According to a fourth aspect of the present invention, the test information sampling means comprises means for allowing one piece of the test sampling information to be associated with each of the newly received flow rate set values (R0) and stored in the storage means in association with the flow rate set value (R0) and for allowing the test sampling information to be associated with the flow rate set value (R0) and stored in the storage means until a predetermined upper limit number of storage entries is reached.

According to a fifth aspect of the present invention, the test information sampling means comprises means for allowing a plurality of pieces of the test sampling information to be associated with each of the newly received flow rate set values (R0) and stored in the storage means in association with the flow rate set value (R0) and for allowing the test sampling information to be associated with the flow rate set value (R0) and stored in the storage means until a predetermined upper limit number of storage entries is reached.

According to a sixth aspect of the present invention, the flow rate test means comprises second flow rate test means for determining a flow rate difference as test information regarding flow control when the new valve drive control information (V1) is delivered, the flow rate difference being a difference between the new detected flow rate value (R1) and a detected flow rate value serving as a reference, the detected flow rate value being associated with both the new valve drive control information (V1) determined with reference to the valve property information and a new detected pressure value (P1) made available upon reception of the detected flow rate value (R1).

According to a seventh aspect of the present invention, the control means comprises means for determining whether a value of the coefficient of association (A) computed sequentially by the valve control information gradient computation means is out of a range of predetermined threshold values; and when the value of the coefficient of association (A) is determined to be out of the range of the threshold values, the control means provides control to execute the flow rate test means.

According to an eighth aspect of the present invention, the control means comprises: flow rate correction means for determining valve drive control information serving as a reference and determined with reference to the valve property information, after delivery of the new valve drive control information (V1) determined based on a newly received detected flow rate value (R1), the valve drive control information being associated with both the newly received detected flow rate value (R1) and the newly received detected pressure value (P1); and the control means delivers the valve drive control information serving as a reference and determined by the flow rate correction means to the flow control valve mechanism.

According to a ninth aspect of the present invention, the control means comprises test sampling information increase/decrease tendency determination means for determining, in relation to a predetermined number of pieces of the valve drive control information (V1) and the detected pressure values (P1) together constituting the test sampling information associated with any two types of the flow rate set value, whether a differential value (Sv) between neighboring pieces of the valve drive control information (V1) in their temporal sequence of storage is positive or negative and similarly whether a differential value (Pv) between the detected pressure values (P1) is positive or negative; and when both the differential value (Sv) and the differential value (Pv) are all determined to be "positive" or "negative", the control means executes the valve control information gradient computation means.

According to a tenth aspect of the present invention, the control means comprises flow rate correction inquiry means, the flow rate correction inquiry means having means for transmitting to the external system an inquiry control command relating to an inquiry about whether a flow rate through the fluid path is permitted to be corrected and another means for receiving a response to the inquiry control command, the transmission and reception being carried out after executing the flow rate test means; and after receiving a control command related to a permission of flow rate correction as a response to the inquiry control command, the control means executes the flow rate correction means.

According to an eleventh aspect of the present invention, there is provided a test method for a flow controller including flow rate detection means for detecting a flow rate of a fluid passing through a fluid path, a flow control valve mechanism, provided in the fluid path, for controlling the flow rate by regulating valve opening in accordance with valve drive control information, and control means for receiving at least one type of a flow rate set value from an external system and delivering the valve drive control information to the flow control valve mechanism to control the valve opening so as to adjust the flow rate through the fluid path to the received flow rate set value.

The method comprises:

a step to be carried out when the fluid is allowed to flow through the fluid path in advance to deliver the valve drive control information serving as a reference to the flow control valve mechanism, the step being executed for storing information, indicative of a relationship between the reference valve drive control information and a detected flow rate value serving as a reference and detected by the flow rate detection means, in storage means of the control means as valve property information in association with a detected pressure value of the fluid;

a test information sampling step to be carried out when the control means is receiving a new flow rate set value (R0) from the external system, and delivering to the flow control valve mechanism the valve drive control information determined based on a detected flow rate value received from the flow rate detection means at predetermined time intervals, thereby providing control to adjust the flow rate to the flow rate set value (R0), this step being executed to allowing test sampling information to be associated with the flow rate set value (R0) and stored in the storage means, the test sampling information being comprised, for each of the newly received flow rate set values (R0), of the detected flow rate value (R1) received from the flow rate detection means, a detected pressure value (P1) of the fluid made available upon reception of the detected flow rate value (R1), and valve drive control information (V1) determined based on the detected flow rate value (R1) and delivered to the flow control valve mechanism;

a valve control information gradient computation step to be carried out on a predetermined number of pieces of the test sampling information associated with the flow rate set value (R0) and stored in the storage means, the step being executed for sequentially determining a coefficient of association (A) from the detected flow rate value (R1) and the valve drive control information (V1) corresponding to each other in their temporal sequence of storage, the coefficient of association (A) indicating an association of the detected flow rate value (R1) and the valve drive control information (V1) together constituting the test sampling information; and a flow rate test step to be carried out after executing the valve control information gradient computation step, for determining a valve control difference as test information regarding flow control, the valve control difference being a difference between new valve drive control information (V1) determined based on a newly received detected flow rate value (R1) and valve drive control information serving as a reference, the reference valve drive control information being determined with reference to the valve property information and associated with both the newly received detected flow rate value (R1) and a newly received detected pressure value (P1).

According to a twelfth aspect of the present invention, the valve control information gradient computation step includes a first gradient computation step for determining the coefficient of association (A) as a gradient of a straight line connecting between intersection point coordinates defined by associating the detected flow rate value (R1) and the valve drive control information (V1) in their temporal sequence of storage with two-dimensional coordinate axes, respectively, the detected flow rate value (R1) and the valve drive control information (V1) constituting the test sampling information associated with any two types of the flow rate set value.

According to a thirteenth aspect of the present invention, the valve control information gradient computation step includes a second gradient computation step for determining the coefficient of association (A) as a gradient of a straight line connecting between origin coordinates and intersection point coordinates defined by associating the detected flow rate value (R1) and the valve drive control information (V1) in their temporal sequence of storage with two-dimensional coordinate axes, respectively, the detected flow rate value (R1) and the valve drive control information (V1) constituting the test sampling information associated with any one type of the flow rate set value.

According to a fourteenth aspect of the present invention, the test information sampling step includes a sub-step for allowing one piece of the test sampling information to be associated with each of the newly received flow rate set values (R0) and stored in the storage means in association with the flow rate set value (R0) and for allowing the test sampling information to be associated with the flow rate set value (R0) and stored in the storage means until a predetermined upper limit number of storage entries is reached.

According to a fifteenth aspect of the present invention, the test information sampling step includes a sub-step for allowing a plurality of pieces of the test sampling information to be associated with each of the newly received flow rate set values (R0) and stored in the storage means in association with the flow rate set value (R0) and for allowing the test sampling information to be associated with the flow rate set value (R0) and stored in the storage means until a predetermined upper limit number of storage entries is reached.

According to a sixteenth aspect of the present invention, the flow rate test step includes a second flow rate test step for determining a flow rate difference as test information regarding flow control when the new valve drive control information (V1) is delivered, the flow rate difference being a difference between the new detected flow rate value (R1) and a detected flow rate value serving as a reference, the detected reference flow rate value being associated with both the new valve drive control information (V1) determined with reference to the valve property information and a new detected pressure value (P1) made available upon reception of the detected flow rate value (R1).

According to a seventeenth aspect of the present invention, the method further comprises a step for determining whether a value of the coefficient of association (A) computed sequentially by the valve control information gradient computation step is out of a range of predetermined threshold values; when the value of the coefficient of association (A) is determined to be out of the range of the threshold values, the flow rate test step is executed.

According to an eighteenth aspect of the present invention, the method further comprises: a test sampling information increase/decrease tendency determination step to be carried out on a predetermined number of pieces of the valve drive control information (V1) and the detected pressure value (P1) constituting the test sampling information associated with any two types of the flow rate set value, the step being executed for determining whether a differential value (Sv) between neighboring pieces of the valve drive control information (V1) in their temporal sequence of storage is positive or negative and similarly whether a differential value (Pv) between the detected pressure values (P1) is positive or negative; when both the differential value (Sv) and the differential value (Pv) are all determined to be "positive" or "negative", the valve control information gradient computation step is executed.

According to a nineteenth aspect of the present invention, there is provided a method for enabling a flow controller to control a flow rate through a fluid path, the flow controller including flow rate detection means for detecting a flow rate of the fluid passing through the fluid path, a flow control valve mechanism, provided in the fluid path, for controlling the flow rate by regulating valve opening in accordance with valve drive control information, and control means for receiving at least one type of a flow rate set value from an external system and delivering the valve drive control information to the flow control valve mechanism to control the valve opening so as to adjust the flow rate through the fluid path to the received flow rate set value.

The method comprises:

a step to be carried out when the fluid is allowed to flow through the fluid path in advance to deliver the valve drive control information serving as a reference to the flow control valve mechanism, the step being executed for storing information, indicative of a relationship between the reference valve drive control information and a detected flow rate value serving as a reference and detected by the flow rate detection means, in storage means of the control means as valve property information in association with a detected pressure value of the fluid;

a test information sampling step to be carried out when the control means is receiving a new flow rate set value (R0) from the external system, and delivering to the flow control valve mechanism the valve drive control information determined based on a detected flow rate value received from the flow rate detection means at predetermined time intervals, thereby providing a control to adjust the flow rate to the flow rate set value (R0), the step allowing test sampling information to be associated with the flow rate set value (R0) and stored in the storage means, the test sampling information including, for each of the newly received flow rate set values (R0), i) the detected flow rate value (R1) received from the flow rate detection means, ii) a detected pressure value (P1) of the fluid made available upon reception of the detected flow rate value (R1), and iii) valve drive control information (V1) determined based on the detected flow rate value (R1) and delivered to the flow control valve mechanism;

a valve control information gradient computation step to be carried out on a predetermined number of pieces of the test sampling information associated with the flow rate set value (R0) and stored in the storage means, the step being executed for sequentially determining a coefficient of association (A) from the detected flow rate value (R1) and the valve drive control information (V1) corresponding to each other in their temporal sequence of storage, the coefficient of association (A) indicating an association of the detected flow rate value (R1) and the valve drive control information (V1) constituting the test sampling information;

a flow rate correction step to be carried out after a value of the coefficient of association (A) computed sequentially in the valve control information gradient computation step is determined to be out of a range of predetermined threshold values and new valve drive control information (V1) determined based on a newly received detected flow rate value (R1) is delivered, the step being then executed for determining valve drive control information, serving as a reference, determined with reference to the valve property information and associated with both the newly received detected flow rate value (R1) and a newly received detected pressure value (P1); and a step for delivering to the flow control valve mechanism the valve drive control information serving as a reference and determined in the flow rate correction step.

According to a twentieth aspect of the present invention, the valve control information gradient computation step includes a first gradient computation step for determining the coefficient of association (A) as a gradient of a straight line connecting between intersection point coordinates defined by associating the detected flow rate value (R1) and the valve drive control information (V1) in a temporal sequence of their storage with two-dimensional coordinate axes, respectively, the detected flow rate value (R1) and the valve drive control information (V1) constituting the test sampling information associated with any two types of the flow rate set value.

According to a 21st aspect of the present invention, the valve control information gradient computation step includes a second gradient computation step for determining the coefficient of association (A) as a gradient of a straight line connecting between origin coordinates and intersection point coordinates defined by associating the detected flow rate value (R1) and the valve drive control information (V1) in a temporal sequence of their storage with two-dimensional coordinate axes, respectively, the detected flow rate value (R1) and the valve drive control information (V1) constituting the test sampling information associated with any one type of the flow rate set value.

According to a 22nd aspect of the present invention, the test information sampling step includes a sub-step for allowing one piece of the test sampling information to be associated with each of the newly received flow rate set values (R0) and stored in the storage means in association with the flow rate set value (R0) and for allowing the test sampling information to be associated with the flow rate set value (R0) and stored in the storage means until a predetermined upper limit number of storage entries is reached.

According to a 23rd aspect of the present invention, the test information sampling step includes a sub-step for allowing a plurality of pieces of the test sampling information to be associated with each of the newly received flow rate set values (R0) and stored in the storage means in association with the flow rate set value (R0) and for allowing the test sampling information to be associated with the flow rate set value (R0) and stored in the storage means until a predetermined upper limit number of storage entries is reached.

According to a 24th aspect of the present invention, the method further comprises a test sampling information increase/decrease tendency determination step carried out on a predetermined number of pieces of the valve drive control information (V1) and the detected pressure value (P1) constituting the test sampling information associated with any two types of the flow rate set value, the step being executed for determining whether a differential value (Sv) between neighboring pieces of the valve drive control information (V1) in their temporal sequence of storage is positive or negative and similarly whether a differential value (Pv) between the detected pressure values (P1) is positive or negative; when both the differential value (Sv) and the differential value (Pv) are all determined to be "positive" or "negative", the valve control information gradient computation step is executed.

The present invention has the following effects.

(1) For each flow rate set value (R0), a predetermined number of pieces of test sampling information made up of three types of information are collected in temporal sequence. More specifically, the three types of information include valve drive control information (V1) delivered by control means 8 to a flow control valve mechanism 7, a detected flow rate value (R1) available upon delivery of the valve drive control information (V1), and a detected pressure value (P1). Then, the three types of information thus collected are analyzed to determine whether there has occurred a non-negligible deviation in flow control with respect to the flow rate set value (R0) of the flow controller, caused due to the aging of the manufacturing line including the flow controller of the present invention.

If the result of the determination shows that a non-negligible deviation has occurred, the flow rate test means is executed to find a valve control difference as test information regarding the flow control. The valve control difference is a difference between the valve drive control information (V1) newly delivered by the control means 8 to the flow control valve mechanism 7 and reference valve drive control information determined with reference to the valve property information that has been pre-stored in storage means as reference test information. Furthermore, when this new valve drive control information (V1) is delivered, the flow rate test means determines, as test information regarding the flow control, the flow rate difference or a difference between the newly detected flow rate value (R1) and a detected flow rate value serving as a reference and determined referring to the valve property information serving as the reference test information.

As can be seen from above, the invention is characterized by determining whether there has occurred a non-negligible deviation in flow control, based on actual data on flow control that has been collected for several days or several weeks. This makes it possible to provide the flow controller which has been improved in keeping track of degradation in accuracy of flow control resulting from the equipment aging, thereby rendering it possible to take action as appropriate against the degradation in accuracy.

(2) The present invention provides valve control information gradient computation means which determines whether there has occurred a non-negligible deviation in flow control. The means sequentially determines a gradient (coefficient of association (A)) of a straight line connecting between the intersection point coordinates defined by associating the detected flow rate value (R1) and the valve drive control information (V1) with two-dimensional coordinate axes in a temporal sequence of their storage, respectively. Here, the detected flow rate value (R1) and the valve drive control information (V1) constitute the test sampling information associated with any two types of flow rate set value. It is then determined based on the value of the coefficient of association (A) whether there has occurred a non-negligible deviation in flow control. Namely, the gradient of the aforementioned straight line computed based on any two types of the flow rate set value (R0) specified by an external system 9 is used to determine whether there has occurred a non-negligible deviation in flow control. This makes it possible to provide the flow controller which has been improved in keeping track of degradation in accuracy of flow control resulting from the equipment aging.

(3) The present invention allows, after executing the flow rate test means, delivering the valve drive control information to the flow control valve mechanism 7. The valve drive control information is intended to automatically correct the flow rate through a fluid path 4 or to correct the flow rate based on the result of processing the inquiry on the flow rate correction permission issued to the external system 9. This makes it possible to provide the flow controller which can correct the flow rate through the fluid path 4 to the flow rate set value (R0) immediately after there has occurred a non-negligible deviation from the flow rate set value (R0).

BRIEF DESCRIPTION OF THE DRAWINGS

FIG. 7 depicts an explanatory exemplary data structure of a test information sampling table;

FIG. 8 depicts similarly an explanatory exemplary data structure of another test information sampling table;

DETAILED DESCRIPTION OF THE PREFERRED EMBODIMENTS

Figure 1:
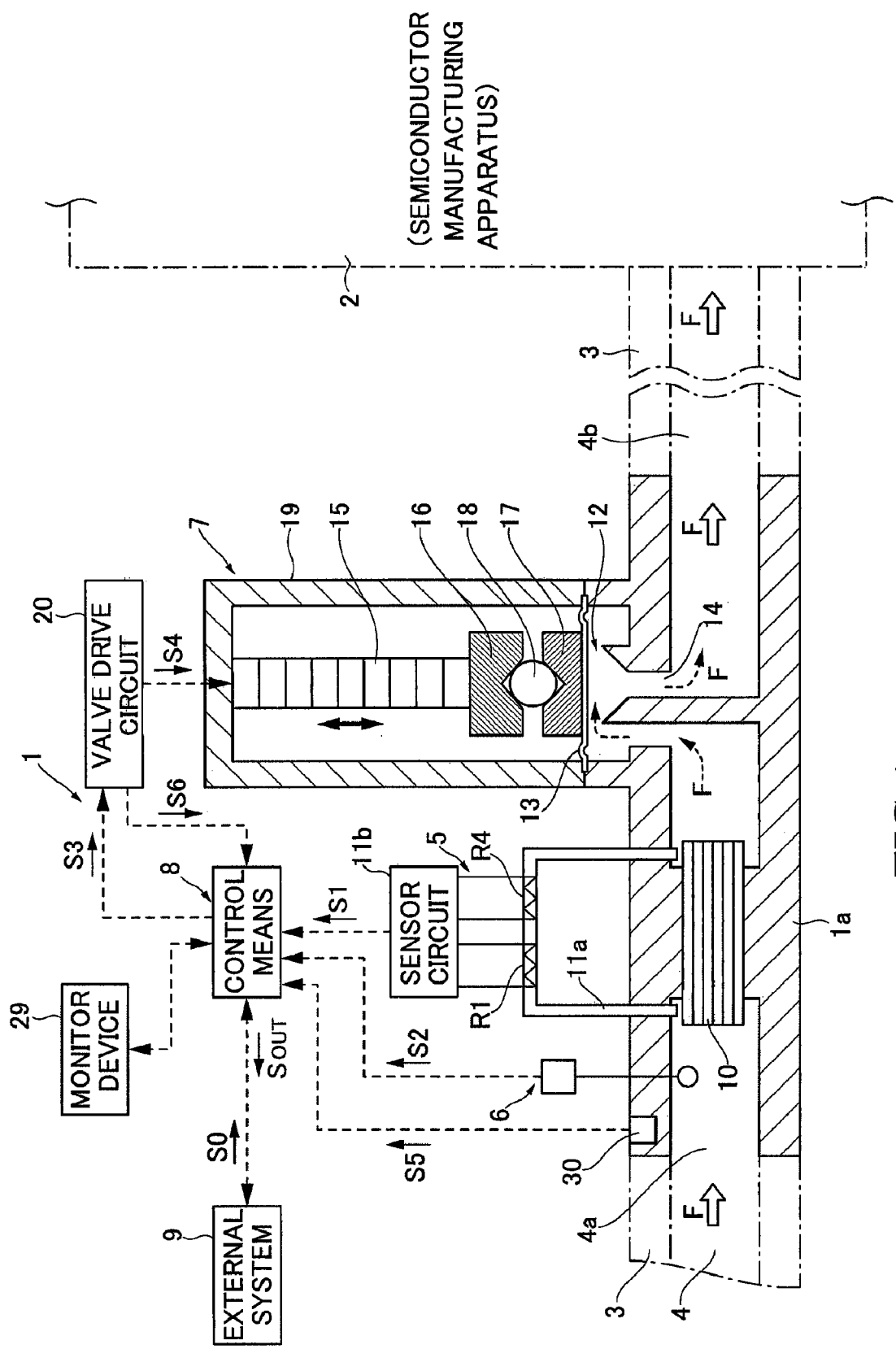
FIG. 1 is an explanatory block diagram illustrating the structure of a flow controller according to an embodiment of the present invention.
Figure 2:
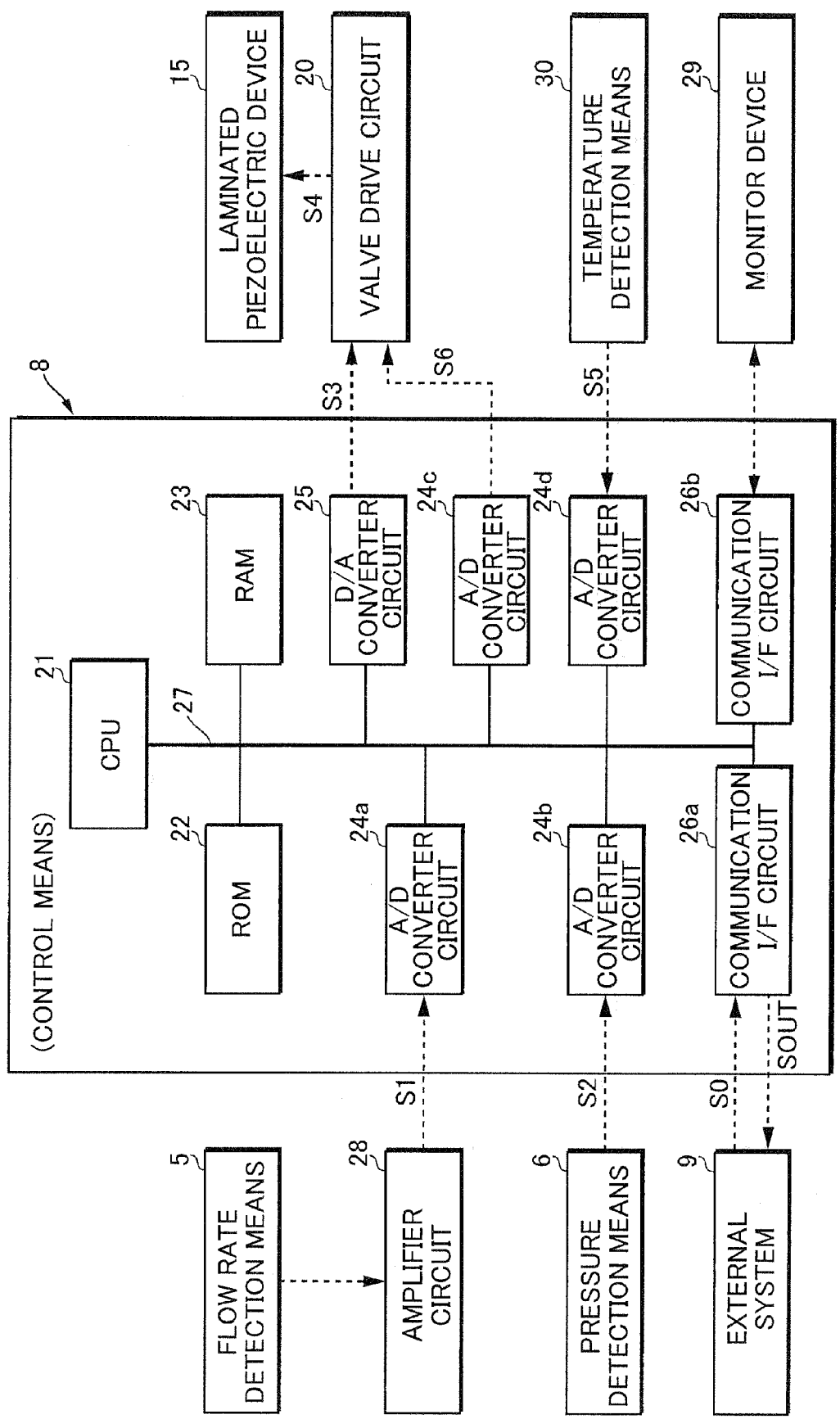
FIG. 2 is an explanatory hardware block diagram illustrating an example of hardware structure of control means included in the flow controller shown in FIG. 1.

Now, the present invention will be described below in more detail with reference to the accompanying drawings in accordance with the preferred embodiments. FIG. 1 is a block diagram illustrating an example of a flow controller according to an embodiment of the present invention. FIG. 2 is a view illustrating an exemplary hardware structure of the control means shown in FIG. 1. Note that by way of example, the embodiments of the present invention described below are concerned with flow rate control of a fluid such as process gases being supplied to the semiconductor manufacturing apparatus such as a CVD apparatus.

[Structure of the Flow Controller]

In FIG. 1, a flow controller 1 according to an embodiment of the present invention is installed, for example, halfway through a fluid path 4 in which a gas fluid such as a process gas (hereinafter referred to simply as the fluid) flows in the direction denoted by arrow F to a chamber (not shown) of a semiconductor manufacturing apparatus 2. The fluid path 4 is formed, for example, within a gas pipe 3 made of stainless steel. As shown in FIG. 1, the flow controller 1 includes a main body block 1*a*, and the main body block 1*a* has a fluid path formed therein to communicate with the fluid path 4. Furthermore, the main body block 1*a* is connected at one end thereof to an upstream side of the gas pipe 3 and at the other end to a downstream side of the gas pipe 3 that communicates with the semiconductor manufacturing apparatus 2.

The flow controller 1 is used to control the flow rate of the fluid being supplied to the chamber (not shown) of the semiconductor manufacturing apparatus 2. While the semiconductor manufacturing apparatus 2 is in operation for deposition or the like, the chamber reduced to a vacuum is kept at a predetermined reduced pressure atmosphere to allow the fluid to be supplied into the chamber under the reduced pressure atmosphere. Although not illustrated in FIG. 1, a gas source such as a tank containing a fluid to be supplied to the semiconductor manufacturing apparatus 2 is connected to an upstream portion of the fluid path 4. There is also a pressure controller which is disposed at a relevant location on the gas pipe 3 coupling between the gas source and the flow controller 1 in order to regulate the pressure of the fluid supplied from the gas source to an appropriate value.

The flow controller 1 having the main body block 1*a* includes flow rate detection means 5 for detecting the flow rate of the fluid passing through the fluid path 4 and providing the detected flow rate value, pressure detection means 6 for detecting the pressure of the fluid passing through the fluid path 4 and providing the detected pressure value, a flow control valve mechanism 7 for controlling the flow rate of the fluid through the fluid path 4, and control means (controller) 8 for controlling the operation of the flow controller 1. Note that the pressure detection means 6 is not necessarily required to be integrated with the flow controller 1. For example, the pressure detection means 6 may be disposed at a relevant location along the fluid path 4 formed in the gas pipe 3, allowing the control means 8 to include detected pressure value reception means for receiving the detected pressure value.

In general, the semiconductor manufacturing line includes an external controller (hereinafter referred to as the external system) 9 such as a host computer for controlling and monitoring the operation of the semiconductor manufacturing apparatus 2, such as a CVD apparatus disposed in the manufacturing line. Furthermore, when the semiconductor manufacturing (CVD) apparatus 2 performs deposition or the like, the external system 9 transmits, as a flow rate setting signal S0 to the control means 8 of the flow controller 1, a flow rate set value (target flow rate value) indicative of the flow rate of the fluid to be supplied to the semiconductor manufacturing apparatus 2. Then, having received the flow rate setting signal S0, the control means 8 executes pre-implemented flow control software (hereinafter referred to simply as the control program) to provide control so that the flow rate through the fluid path 4 coincides with the flow rate set value specified by the flow rate setting signal S0. To this end, valve drive control information (a valve drive control voltage) is determined by PID operation at predetermined time intervals, for example, at intervals of 10 msec, and then the resulting valve drive control information is delivered to the flow control valve mechanism 7.

Furthermore, those detected values provided by the flow rate detection means 5 and the pressure detection means 6 as well as various types of flow rate test related information determined by computational processing are transmitted by the control means 8 as an output signal SOUT to the external system 9. Note that the aforementioned external system 9 is not necessarily required to be an upper-level controller such as a host computer for controlling the operation of the entire manufacturing line. For example, it can be an input device connected to the flow controller 1 to supply the flow rate set value to the flow controller 1.

The information regarding the flow rate set value transmitted as the flow rate setting signal S0 from the external system 9 to the control means 8 is transmitted in analog or digital form. Furthermore, the type of flow rate set value transmitted as the flow rate setting signal S0 is transmitted as a voltage value (V) or a flow rate value (cc/min). To transmit the voltage value (V) as the flow rate set value, predetermined values in the range of, for example, "0 V to 5 V" are transmitted as analog or digital signals, while in transmitting the flow rate value, predetermined values in the range of, for example, "0 cc/min to 100 cc/min" are transmitted in analog or digital form.

For example, when the aforementioned flow rate set value is transmitted from the external system 9 to the control means 8 as the voltage value (V), "0 V" indicates that the flow rate of the fluid passing through the fluid path 4 is regulated to "0", and "5 V" indicates that the flow rate is regulated to the maximum flow rate (the full-scale flow rate), for example, 100 cc/min, which the flow controller 1 can allow through the fluid path 4.

FIG. 1 illustrates an example where the pressure detection means 6, the flow rate detection means 5, and the flow control valve mechanism 7 are arranged in this order from an upstream side 4*a* to a downstream side 4*b* of the fluid path 4. However, the flow rate detection means 5 and the pressure detection means 6 may also be disposed on the downstream side 4*b* of the flow control valve mechanism 7.

The flow rate detection means 5 includes a bypass pipe group 10 made up of a plurality of bypass pipes in bundles which have a predetermined length and which are arranged from the upstream side 4*a* towards the downstream side 4*b* of the fluid path 4. The flow rate detection means 5 also includes sensor pipes 11*a* which are disposed at both opening sides of the bypass pipe group 10 so as to bypass the bypass pipe group 10. This structure allows the flow through the sensor pipe 11*a* of the fluid along the fluid path 4 to be reduced as compared to the flow through the bypass pipe group 10 as well as to pass therethrough at a constant rate. That is, the sensor pipe 11*a* can pass therethrough always a constant flow rate in proportion to the flow through the fluid path 4.

Furthermore, at the portion where the sensor pipe 11*a* is located outside the fluid path 4, there is a pair of serially connected electric resistor lines R1 and R4 wound around the portion. Furthermore, two reference electric resistor lines R2 and R3 (not shown) and the electric resistor lines R1 and R4 form a so-called bridge circuit. The electric resistor lines R1 and R4 are formed of a material that varies in electric resistance with temperature. A certain electric current applied to the bridge circuit establishes a potential difference, which is determined by a sensor circuit 11*b* and then delivered as a flow rate detection signal S1 to the control means 8, for example, as a voltage value from 0 V to 5 V. Note that the voltage value determined by the sensor circuit 11*b* is amplified at an amplifier circuit 28 (see FIG. 2) and then delivered to the control means 8 via an A/D converter circuit 24*a* (see FIG. 2).

The control means 8 receives the detected flow rate value expressed by the flow rate detection signal S1, i.e., the information (voltage value) regarding the present flow rate value of the fluid passing through the fluid path 4 from the flow rate detection means 5 at predetermined time intervals (for example, 10 msec). Then, based on the received information, the control means 8 determines the detected flow rate value (R1) of the fluid currently passing through the fluid path 4 by converting it to, for example, a flow rate in the range of "0 cc/min to 100 cc/min". Then, based on the deviation between the detected flow rate value (R1) and the flow rate set value (for example, 60 cc/min) expressed by the flow rate setting signal S0 received from the external system 9, the control means 8 provides control to allow the flow rate through the fluid path 4 to coincide with the flow rate set value. To this end, the control means 8 determines the valve drive control information (valve drive voltage) for controlling the valve opening of the flow control valve included in the flow control valve mechanism 7, for example, by PID operation, and then delivers the resulting valve drive control information to the flow control valve mechanism 7.

The pressure detection means 6 includes, for example, a pressure transducer. When being controlled by the control means 8, the pressure detection means 6 delivers the information regarding the detected pressure value indicating the pressure of the fluid passing through the fluid path 4 as a pressure detection signal S2 to the control means 8 via the A/D converter circuit.

The flow control valve mechanism 7 has a flow control valve 12 which is provided on the downstream side 4*b* of the bypass pipe group 10 mentioned above. The flow control valve 12 includes a flexible diaphragm 13, such as a metal thin plate of Ni—Co alloy, which acts as a valve body to directly control the flow rate of the fluid passing through the fluid path 4. Furthermore, the fluid path formed inside the main body block 1a of the flow controller 1 is provided with a valve port 14 by machining or the like. Then, the diaphragm 13 is flexibly deformed (back and forth) as appropriate towards the valve port 14, thereby allowing an arbitrary controlling of the valve opening of the valve port 14. In this manner, the diaphragm 13 is flexibly deformed to thereby arbitrarily control the valve opening defined by the flow control valve 12. Means for providing this control is realized by an actuator 15 disposed on the upper surface of the diaphragm 13.

The actuator 15 maybe implemented, for example, by a laminated piezoelectric device (piezoelectric transducer) or an electromagnetic thrust generation means. In the following descriptions, the laminated piezoelectric device will be employed, by way of example, as the actuator which will be denoted as the laminated piezoelectric device 15.

The laminated piezoelectric device 15 has, for example, a metal push pad 16 attached to its bottom. On the other hand, the diaphragm 13 has, for example, a metal base pad 17 attached to its upper surface so as to oppose the push pad 16. Then, a recessed portion is formed at the center of the opposing surface of each of the push pad 16 and the base pad 17, each recessed portion being formed as having a V-shaped cross section. Within this V-shaped recessed portion, for example, a rigid sphere 18 may be intervened to provide a rigid and continuous linkage as a whole. With the laminated piezoelectric device 15 or the actuator being configured in this manner, a relevant voltage may be applied to the laminated piezoelectric device 15. This allows the diaphragm 13 to receive a direct and uniform transmission of a thrust resulted from a linear microscopic displacement (expansion and contraction) which is produced by the laminated piezoelectric device 15 that acts as the thrust generation means.

The laminated piezoelectric device 15 has layers of multiple PZT ceramic plates on which electrodes are formed. With this structure, a DC voltage applied to the laminated piezoelectric device 15 produces microscopic longitudinal expansions and contractions depending on the voltage value, thereby causing the thrust resulting from the expansion and contraction to be generated on the laminated piezoelectric device 15 in the direction of the layers being stacked. Note that the laminated piezoelectric device 15, the push pad 16, the base pad 17, the rigid sphere 18, and the diaphragm 13, which together constitute the flow control valve mechanism 7, are housed within a casing 19.

As described above, the control means 8 executes the computing operation of the pre-implemented control program in order to determine the control information (the valve drive control information) for controlling the valve opening of the flow control valve 12 of the flow control valve mechanism 7. Then, the control means 8 delivers to a valve drive circuit 20 as a valve drive signal S3 the resulting valve drive control information to control the valve opening. The valve drive signal S3 serves as analog or digital control information for applying a predetermined voltage to the laminated piezoelectric device 15.

Note that a DC voltage, generally about 0 V to 150 V, applied to the laminated piezoelectric device 15 can produce microscopic displacements (expansions and contractions) depending on the value of the applied voltage. Accordingly, the control means 8 delivers an analog signal (or a digital signal) obtained by converting a value of "0 V to 150 V", for example, to "0 V to 5 V", as the valve drive signal S3 to the valve drive circuit 20.

On the other hand, the valve drive circuit 20 is designed to convert a voltage value in the range of "0 V to 5 V" of the valve drive signal S3 to a valve drive voltage for generating a microscopic displacement (thrust) on the laminated piezoelectric device 15. Then, the valve drive voltage (the valve drive control information) converted by the valve drive circuit 20 is applied (delivered) to the laminated piezoelectric device 15 as a valve drive voltage signal S4. The valve drive control information in the form of the valve drive voltage signal S4 supplied to the laminated piezoelectric device 15 causes microscopic displacements (upward and downward expansions and contractions shown in FIG. 1) to occur on the laminated piezoelectric device 15 depending on the valve drive control information (voltage value) applied to the laminated piezoelectric device 15. This results in the valve opening of the flow control valve 12 in the flow control valve mechanism 7 being varied, thereby controlling the flow rate of the fluid passing through the fluid path 4.

[Structure of the Control Means]

The control means 8 is made up of a controller (control board) having a microcomputer with a CPU. FIG. 2 illustrates an exemplary hardware structure of the control means 8.

As shown in FIG. 2, the control means 8 includes a circuit (control) board which mainly includes a CPU 21, a ROM 22, a RAM 23, A/D converter circuits 24a, 24b, 24c, and 24d, a D/A converter circuit 25, and communication interface (I/F) circuits 26a and 26b installed thereon. Furthermore, the CPU 21, the ROM 22, the RAM 23, the A/D converter circuits 24a, 24b, 24c, 24d, the D/A converter circuit 25, the communication I/F circuits 26a and 26b are connected to a bus line 27. Note that the A/D converter circuits 24a to 24d and the D/A converter circuit 25 are connected to the bus line 27 via input and output I/F circuits; however, the input and output I/F circuits are not shown in FIG. 2.

The CPU 21 is a central processing unit for parsing the control program stored in the ROM 22 to control the operation of the flow controller 1, and may best be implemented with a high-speed CPU such as a 32-bit CPU. The ROM 22 has the control program for controlling the operation of the flow controller 1 and various types of reference data. Note that the ROM 22 may be an EPROM (Erasable Programmable Read Only Memory) or a flash memory to store the control program.

The RAM 23 is a storage means (memory) for pre-storing the aforementioned control program in a work area and reference data (such as valve property information which is to be described later) for the program stored in the ROM 22 to control the operation of the flow controller 1. The RAM 23 should be a memory device that is capable of retaining what has been stored therein even when the power supply to the control means 8 is turned OFF. On the other hand, the aforementioned valve property information may also be stored in a flash memory. Furthermore, as the RAM 23, a CPU built-in RAM integrated in the CPU 21 may also be employed for the program to be executed at high speeds.

As shown in FIG. 2, the aforementioned A/D converter circuits 24a, 24b, 24c, and 24d are connected, for example, with the flow rate detection means 5, the pressure detection means 6, and temperature detection means 30. On the other hand, the flow rate detection means 5 may also be connected to the A/D converter circuit 24a via the amplifier circuit 28. Furthermore, the D/A converter circuit 25 is connected with the valve drive circuit 20, so that the valve drive control information (valve drive voltage) regulated by the valve drive circuit 20 is applied as the valve drive voltage signal S4 to the laminated piezoelectric device 15.

The communication I/F circuits 26a and 26b act as an I/F circuit for data communication with external devices. The communication I/F circuit 26a is connected, for example, with an upper-level host computer serving as the external system 9. On the other hand, the I/F circuit 26b is connected with a monitor device 29 made up of a personal computer or the like. The monitor device 29 is connected as required for use, for example, when the aforementioned valve property information is initially stored (entered) into the RAM 23 at the time of introduction of the flow controller 1 of the present invention to the semiconductor manufacturing line. The monitor device 29 is also connected, during operation of the semiconductor manufacturing apparatus 2, to monitor (display) information, which is carried by detection signals provided by the flow rate detection means 5 and the pressure detection means 6, or test information to be described later. Furthermore, as described above, the monitor device 29 may also be employed as an input device for entering flow rate set values.

[Data Structure of the Valve Property Information]

A description will now be given to an exemplary data structure of the valve property information (a valve property information table K1) stored in the RAM 23 of the control means 8. The valve property information is found in a data table which has information to be referred to in testing the accuracy of the flow control provided by the flow controller 1 to control the flow rate of the fluid passing through the fluid path 4. The valve property information, which is pre-stored in (registered with) the RAM 23 as a data table, is also referred to when control is provided to correct the flow rate through the fluid path 4 based on the test results.

With the pressure of the fluid passing through the fluid path 4 towards the flow control valve mechanism 7 being set to a predetermined pressure value, the valve drive control information (Vs) (a valve drive voltage) carried by the valve drive voltage signal S4 may be applied to the laminated piezoelectric device 15 to activate the flow control valve mechanism 7. In this case, it is known that when the flow rate of the fluid passing through the fluid path 4 is measured, and then the relationship between the valve drive control information (Vs) and the flow rate of the fluid (Rs) is determined, it is allowed to obtain information as shown in FIG. 3.

Figures 3, 4:
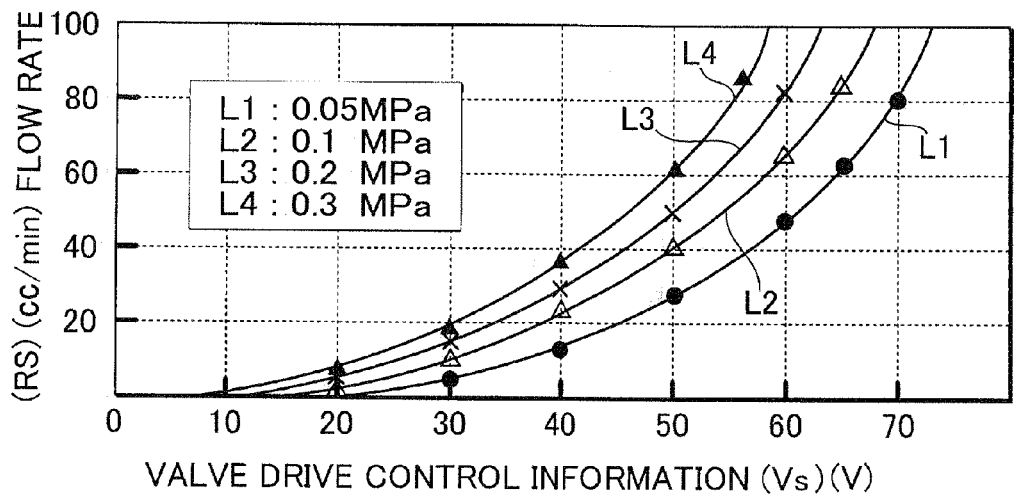
FIG. 3 is a graph showing the relationship between the valve drive voltage (Vs) applied to a laminated piezoelectric device serving as an actuator of the flow control valve mechanism shown in FIG. 1 and the flow rate (Rs) of a fluid passing through a fluid path, with respect to the pressure value of this fluid.
FIG. 4 depicts an explanatory valve property information table stored in storage means of the control means, the table having an exemplary data structure of the information which indicates the relationship between the valve drive voltage (Vs) and the flow rate (Rs) shown in FIG. 3, and which is associated with the pressure value of the fluid.

The graph shown in FIG. 3 was obtained when the fluid passing through the fluid path 4 was set to reference pressure values, for example, 0.05 MPa, 0.1 MPa, 0.2 MPa, and 0.3 MPa. More specifically, for each of the pressure values of the fluid, the graph shows the relationship between the detected flow rate value (Rs) (cc/min) serving as a reference and provided by the flow rate detection means 5 on one hand and the valve drive control information (Vs) serving as a reference and applied to the laminated piezoelectric device 15 on the other. As shown in FIG. 3, the relationship between the reference valve drive control information (Vs) and the reference flow rate (Rs) is indicated by curve L1 with the pressure of the fluid being set to 0.05 MPa, curve L2 with the pressure being set to 0.1 MPa, curve L3 with the pressure set to 0.2 MPa, and curve L4 with the pressure set to 0.3 MPa.

As shown in FIG. 3, since the valve opening of the flow control valve 12 increases with an increase in the valve drive control information (Vs), the flow rate through the fluid path 4 tends to increase curvedly. Furthermore, in the relationship between the valve drive control information (Vs) and the flow rate (Rs) with the valve drive control information (Vs) being kept constant, the flow rate through the fluid path 4 increases because the pressure difference of the fluid increases as the pressure of the fluid increases from 0.05 MPa to 0.3 MPa.

According to the present invention, a test operation under actual conditions is conducted on the flow controller 1 after having been manufactured and prior to shipment or initially when the flow controller 1 is installed on the gas pipe 3 through which a process gas (fluid) is supplied, for example, to the CVD apparatus of the semiconductor manufacturing line. During this test operation, for each of the aforementioned plurality of reference pressure values of the fluid, the detected flow rate values (in cc/min or voltage values) provided by the flow rate detection means 5 are collected when various reference valve drive voltage signals S4 representing valve drive control information are applied to the laminated piezoelectric device 15. Then, from the data (information) thus collected, as shown in FIG. 3 previously referred to, data (information) indicative of the relationship between the detected flow rate value (Rs) and the valve drive control information (Vs) is determined for each of the reference pressure values of the fluid. These pieces of information are pre-stored in or registered with a data table (hereinafter referred to as the valve property information table K1) on a predetermined storage area of the RAM 23.

As described above, the valve property information table K1 mainly acts as a data table which the control program implemented in the control means 8 refers to as reference information for automatically testing the flow control provided by the flow controller 1 in terms of accuracy while the CVD apparatus or the like is operating and the flow controller 1 of the present invention is controlling the flow rate of the process gas.

FIG. 4 shows an exemplary data structure of the valve property information table K1 stored in the RAM 23. The valve property information table K1 is a registered data table which contains the relationship between the reference valve drive control information (Vs) applied to the laminated piezoelectric device 15 and the reference detected flow rate value (Rs) (cc/min) obtained by the flow rate detection means 5 detecting the flow rate of the fluid passing through the fluid path 4 at the time of application of the reference valve drive control information (Vs). This relationship is associated with each of the reference pressure values (Ps) of the fluid at the time of the detection, i.e., 0.05 MPa, 0.1 MPa, 0.2 MPa, and 0.3 MPa.

The exemplary data structure of the valve property information table K1 shown in FIG. 4 shows the results which were collected in a test operation under actual conditions with the reference detected flow rate value Rs being set at the intervals of 5 cc/min and with the reference pressure value Ps at 0.05 MPa, 0.1 MPa, 0.2 MPa, and 0.3 MPa. However, the test operation under actual conditions may also be performed with more detailed specifications to create a data table K1 that contains the valve drive control information (Vs) and the detected flow rate value (Rs) at reduced intervals.

[Structure of the Control Program]

Figure 5:
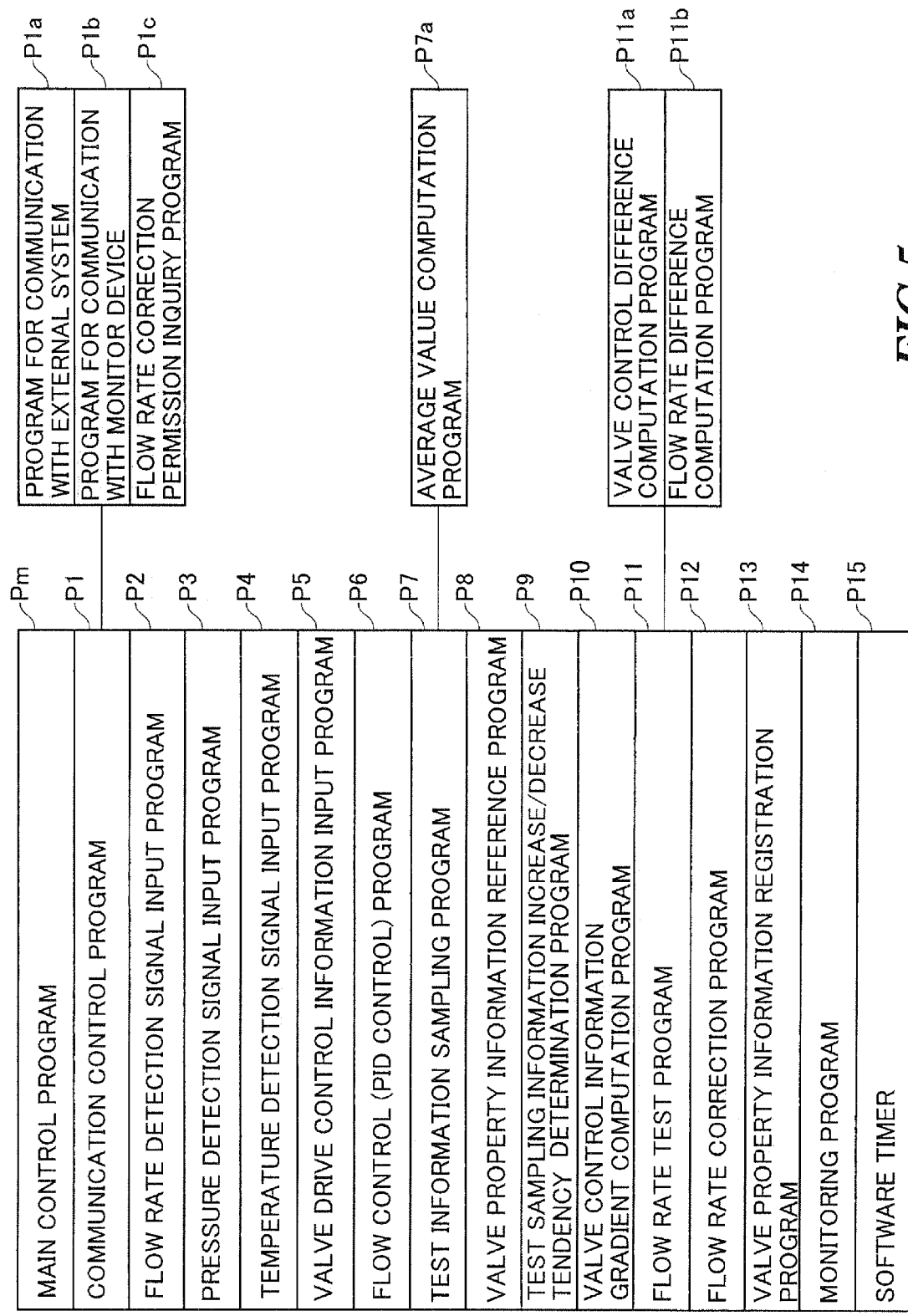
FIG. 5 depicts an explanatory exemplary structure of programs which are implemented in the control means shown in FIG. 1 to control flow rates and test the flow control.

Now, with reference to FIG. 5, a description will be given to the structure of the control program stored in the ROM 22 of the control means 8 for controlling the operation of the flow controller 1.

The control program stored in the ROM 22 is made up of a main control program Pm, a communication control program P1, a flow rate detection signal input program P2, a pressure detection signal input program P3, a temperature detection signal input program P4, a valve drive control information input program P5, a flow control (PID control) program P6, a test information sampling program P7, a valve property information reference program P8, a test sampling information increase/decrease tendency determination program P9, a valve control information gradient computation program P10, a flow rate test program P11, a flow rate correction program P12, a valve property information registration program P13, a monitoring program P14, a software timer P15, and the like.

The main control program Pm collectively controls the operation of the aforementioned individual programs P1 to P15, so that the flow controller 1 operates under the control provided by the main control program Pm. Note that the main control program Pm is designed to start running when the flow controller 1 is powered ON.

The communication control program P1 is designed to communicate with the external system 9 and the monitor device 29, and has, as subprograms, a communication program P1a for communicating with the external system 9, a communication program P1b for communicating with the monitor device 29, and a flow rate correction permission inquiry program P1c for issuing an inquiry to the external system 9 concerning flow rate correction.

The flow rate detection signal input program P2 receives the detection signal S1 indicative of the detected flow rate value (R1) detected by the flow rate detection means 5 and then temporarily stores the signal S1 in the RAM 23. The pressure detection signal input program P3 receives the detection signal S2 indicative of a detected pressure value (P1) provided by the pressure detection means 6 and then temporarily stores the signal S2 in the RAM 23. The temperature detection signal input program P4 receives a detection signal S5 indicative of the temperature of the fluid detected by the temperature detection means 30 and then temporarily stores the signal S5 in the RAM 23.

Note that the flow rate through the fluid path 4 slightly varies depending on the temperature of the fluid, and thus when the control means 8 controls the flow rate through the fluid path 4, a temperature detection value detected by the temperature detection means 30 should be referenced, as required, to test the flow control and correct the control.

On the other hand, the valve drive control information input program P5 delivers the valve drive control information (V1), which is associated with the valve drive voltage signal S4 applied by the valve drive circuit 20 to the laminated piezoelectric device 15, to the control means 8 as a valve drive voltage signal S6, and then temporarily stores the signal S4 in the RAM 23.

As described above, the valve drive circuit 20 converts a voltage value associated with the valve drive signal S3, which has been computed by the control means 8 and delivered to the valve drive circuit 20, into a voltage value represented by the valve drive voltage signal S4. Accordingly, the valve drive control information input program P5 may also be designed to determine the valve drive voltage signal S6 (S4), i.e., the valve drive voltage signal S4 based on the voltage value associated with the valve drive signal S3 delivered by the control means 8 to the valve drive circuit 20.

The flow control (PID control) program P6 operates to make the flow rate of the fluid passing through the fluid path 4 coincide with the flow rate set value (R0), based on the deviation between the flow rate set value (R0) received from the external system 9 via the flow rate setting signal S0 and the detected flow rate value (R1) provided by the flow rate detection means 5. To this end, for example, the program determines the valve drive control information (V0) by PID operation, and then delivers the resulting valve drive control information (V0) to the valve drive circuit 20 as the aforementioned valve drive signal S3. Then, as described above, the valve drive circuit 20 converts the valve drive signal S3 into the valve drive control information (V1) represented by the valve drive signal S4, allowing the valve drive control information (V1) to be applied to the laminated piezoelectric device 15.

The test information sampling program P7 operates when the control means 8 receives a new flow rate set value (R0) from the external system 9 to allow the aforementioned flow rate control program P6 to control the flow rate through the fluid path 4. More specifically, the program collects (samples) various types of information for testing the accuracy with which the flow controller 1 has controlled the flow rate through the fluid path 4, and then stores the information in the RAM 23 serving as storage means.

Figure 6:
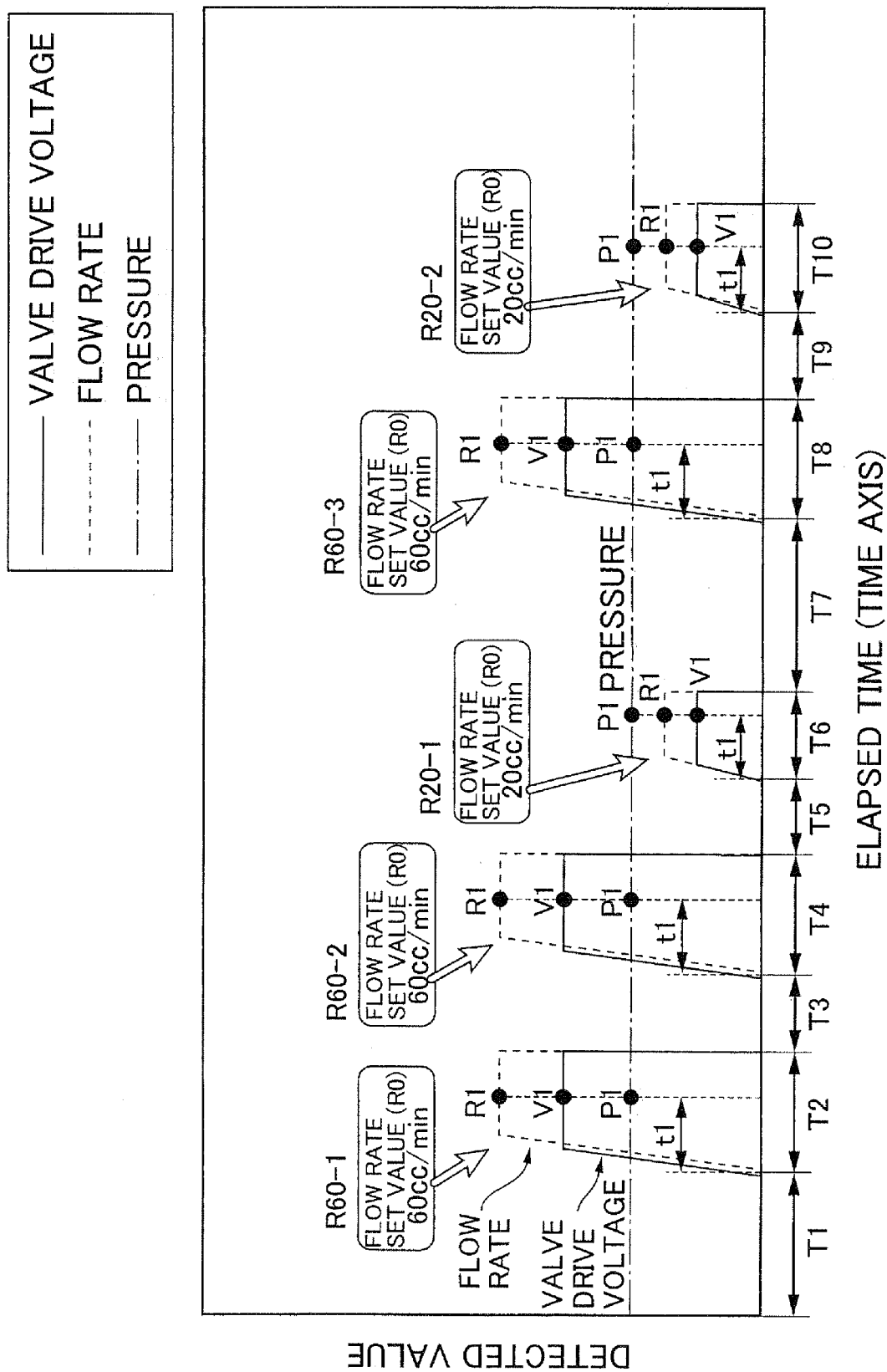
FIG. 6 is an explanatory view illustrating in temporal sequence how the external system shown in FIG. 1 sends the information regarding a flow rate set value to the flow controller.

Typically, any one type of the flow rate set values (R0) is transmitted from the external system 9 to the flow controller 1 for one deposition batch before the semiconductor manufacturing apparatus 2 starts to operate. The flow rate set value (R0) is selected among predetermined plurality of types of the flow rate set values based on the processing schedule such as the deposition by the semiconductor manufacturing apparatus 2. FIG. 6 is a view illustrating in temporal sequence how flow rate set values are transmitted from the external system 9 to the flow controller 1, with the horizontal axis as the time axis representing the elapsed time.

In FIG. 6, those flow rate set values (R0) transmitted from the external system 9 to the flow controller 1 are ordered, for example, in temporal sequence as below.

(1) First, the external system 9 transmits "0" as the flow rate set value (R0) to the flow controller 1. Then, after time T1 has elapsed, the external system 9 transmits "60 cc/min" denoted in FIG. 6 with an identification number (batch number) "R60-1" as a new flow rate set value (R0) to the flow controller 1. This causes the flow controller 1 to regulate for time T2 the flow rate through the fluid path 4 to the flow rate set value "60 cc/min".

(2) After time T2 has elapsed, the external system 9 transmits the flow rate set value (R0) for turning the flow rate to "0". Based on this flow rate set value, the flow controller 1 controls for time T3 the flow rate through the fluid path to "0".

(3) After time T3 has elapsed, the external system 9 transmits again "60 cc/min" as a new flow rate set value (R0) (depicted in FIG. 6 with an identification number "R60-2") to the flow controller 1. Based on this flow rate set value (R0), the flow controller 1 controls for time T4 the flow rate through the fluid path 4 to the flow rate set value "60 cc/min".

(4) Then, after time T4 has elapsed, the external system 9 transmits the flow rate set value (R0) to make the flow rate "0". The flow controller 1 controls for time T5 the flow rate through a fluid path at "0".

(5) After time T5 has elapsed, the external system 9 transmits "20 cc/min" as a new flow rate set value (R0) (denoted in FIG. 6 with an identification number "R20-1") to the flow controller 1. This causes the flow controller 1 to control for time T6 the flow rate through the fluid path 4 to the flow rate set value (R0) "20 cc/min".

(6) Then, after time T6 has elapsed, the external system 9 transmits a flow rate set value (R0) to make the flow rate "0". The flow controller 1 controls for time T7 the flow rate through the fluid path 4 to "0". Subsequently, as shown in FIG. 6, the external system 9 newly transmits, to the flow controller 1, a flow rate set value "60 cc/min" (denoted in FIG. 6 with an identification number "R60-3"), a flow rate set value "20 cc/min" (denoted in FIG. 6 with an identification number "R20-2"), and so on.

As shown in FIG. 6, the external system 9 usually transmits to the flow controller 1 a plurality of types of flow rate set values (R0)—two types, i.e., "60 cc/min" and "20 cc/min" in the example shown in FIG. 6—except such information as to make the flow rate "0", in accordance with the daily work schedule of the semiconductor manufacturing apparatus 2. Furthermore, when a predetermined time has elapsed after having sent any one type of these multiple flow rate set values to the flow controller 1, the external system 9 transmits to the flow controller 1 a flow rate set value (R0) that makes the flow rate through the fluid path 4 to be "0". Although FIG. 6 shows such an example in which the external system 9 transmits two types of flow rate set value (R0) to the flow controller 1, any one of three or more types of flow rate set value (R0) may also be sent to the flow controller 1 in accordance with the work schedule. Further, single one type of flow rate set value (R0) may also be transmitted.

The aforementioned test information sampling program P7 works as shown in FIG. 6 while the flow rate through the fluid path 4 is being controlled according to each of the flow rate set values "60 cc/min", "60 cc/min", "20 cc/min", and so on, which have been transmitted from the external system 9 and corresponding to one new deposition batch. At this time, in relation to each of the flow rate set values (R0) for each one batch, the program P7 associates test sampling information with the flow rate set value (R0) to store (accumulate) a predetermined number of pieces of the test sampling information in temporal sequence in a test information sampling table defined in the RAM 23. Here, the test sampling information is made up of three types of information; the detected flow rate value (R1) and the detected pressure value (P1) which are received from the flow rate detection means 5 and the pressure detection means 6, respectively, and the valve drive control information (V1) determined based on the detected flow rate value (R1) and delivered to the laminated piezoelectric device 15.

Accordingly, the test information sampling table is to have the valve drive control information (V1), the detected flow rate value (R1), and the detected pressure value (P1), which constitute the test sampling information, arranged in the temporal sequence in which they have been sampled and stored.

On the other hand, when the flow controller 1 has received a new flow rate set value (R0) from the external system 9, it is not exactly sure that the flow rate through the fluid path 4 has reached the flow rate set value (R0) or a value close to R0. Accordingly, for each flow rate set value (R0) for one batch, the test information sampling program P7 should sample (receive) the valve drive control information (V1), the detected flow rate value (R1), and the detected pressure value (P1), which together constitute the test sampling information, and store them in the test information sampling table at a certain timing. The timing may be determined in one of the methods defined in (1) or (2) below.

(1) The process is carried out a predetermined time t1 (t1 shown in FIG. 6), for example, 3 minutes after the flow controller 1 has received the flow rate set value (R0) from the external system 9. That is, one piece of the test sampling information is associated with the flow rate set value (R0) and then stored in the RAM 23. The test sampling information is made up of the detected flow rate value (R1) and the detected pressure value (P1), which the control means 8 has newly received, and the valve drive control information (V1) determined based on the newly received detected flow rate value (R1) and delivered to the laminated piezoelectric device 15. The example in FIG. 6 shows one piece of the test sampling information being stored in the test information sampling table at time t1 after a new flow rate set value (R0) for one batch has been received. In FIG. 6, the points indicated with black circles show the timing at which the three types of data constituting the test sampling information are received and stored in the test information sampling table.

The sampling method set forth in (1) is thus followed for each flow rate set value (R0) received from the external system 9 for one batch. Namely, one piece of the test sampling information, i.e., one piece of valve drive control information (V1), one detected flow rate value (R1), and one detected pressure value (P1) are stored in the test information sampling table defined in the RAM 23 in association with the received flow rate set value (R0). Then, the test information sampling program P7 stores a predetermined storage number N (the upper limit of stored entries) of the test sampling information in the test information sampling table for each flow rate set value (R0). This allows the test information sampling table associated with the same flow rate set value (R0) to store the test sampling information for batches, which correspond to different work instructions with the same flow rate set value (R0), sequentially in temporal sequence up to the upper limit N.

(2) The process is carried out at every predetermined time after the flow controller 1 has received from the external system 9 a new flow rate set value (R0) corresponding to one batch, for example, at every 3 minutes after the new flow rate set value (R0) has been received. In other words, as in above (1), the test sampling information formed of the valve drive control information (V1), the detected flow rate value (R1), and the detected pressure value (P1) are associated with the received flow rate set value (R0) and stored sequentially in temporal sequence in the test information sampling table.

According to the sampling method set forth in (2), the test information sampling program P7 also stores in the test information sampling table a predetermined storage number N (the upper limit of stored entries) of the test sampling information for each flow rate set value (R0) The method according to above (2) can be used to store a plurality of pieces of test sampling information in the test information sampling table for each newly received flow rate set value (R0), i.e., for a work instruction for each one batch. On the other hand, either one of the above methods (1) and (2) may be defined and employed as appropriate. For example, the monitor device 29 may be configured to arbitrarily choose either one of the two methods.

Now, with reference to FIGS. 7 and 8, a description will be given to an exemplary data structure of the test information sampling table defined in the storage area of the RAM 23.

The exemplary data structure in FIG. 7 shows the test information sampling table K2 where the flow rate set value (R0) received from the external system 9 is "60 cc/min". In this case, for each received flow rate set value (R0) for one batch, the process samples and stores one piece of valve drive information (V1), one detected flow rate value (R1), and one detected pressure value (P1), which together constitute one piece of test sampling information. For example, the test information sampling program P7 provides each flow rate set value (R0) for one batch received from the external system 9 with "R60-1", "R60-2", . . . as identification information (flow rate set value identification information) a1 for identifying the flow rate set value (R0). Then, in association with the identification information a1, the program P7 stores the valve drive information (V1), the detected flow rate value (R1), and the detected pressure value (P1), which together constitute the test sampling information. Note that the identification information a1 is made up of a predetermined number of digits of information, containing, for example, "R60" as shown in FIG. 7, as the information for identifying a plurality of types of flow rate set values (R0). It is thus made possible to associate each data constituting the test sampling information stored in the test information sampling table K2 with the flow rate set value (R0).

Similarly, the exemplary data structure in FIG. 8 shows the test information sampling table K3 where the flow rate set value (R0) is "20 cc/min". In this case, for each received flow rate set value (R0) for one batch, the process samples and stores one piece of valve drive information (V1), one detected flow rate value (R1), and one detected pressure value (P1), which together constitute one piece of test sampling information.

On the other hand, as described above, the test information sampling program P7 samples and stores each piece of data constituting the test sampling information in the test information sampling tables K2 and K3 in the temporal sequence of sampling. Furthermore, as described above, the identification informational may also contain other information in addition to the information for identifying the plurality of types of flow rate set values (R0) For example, the information a1 may also contain serial number information indicative of the temporal sequence of sampling or additional information on sampling in year, month, day, hour, and minute format. The information in the year, month, day, hour, and minute format may be transmitted by the external system 9 to the flow controller 1 together with the flow rate set value (R0) or entered by means of the monitor device 29.

Moreover, to sample several pieces of test sampling information for each received flow rate set value (R0) for one batch, the identification information a1 may also include serial number information indicative of the sequence of sampling for that batch. On the other hand, as described above, the number of times of sampling the test sampling information for each flow rate set value (R0) received for one batch should be predetermined, for example, as one at a predetermined time or at predetermined time intervals, i.e., multiple times, after the flow rate set value (R0) has been received.

Referring to the valve property information table K1, the valve property information reference program P8 determines, for example, the reference valve drive control information, which is associated with the detected flow rate value (R1) provided by the flow rate detection means 5 and the detected pressure value (P1) provided by the pressure detection means 6.

The test sampling information increase/decrease tendency determination program P9 determines the tendency of increase and decrease in the amount of storage in temporal sequence of the test sampling information associated with the flow rate set value (R0) and stored in the test information sampling tables K2 and K3. Here, the test sampling information represents the valve drive control information (V1) and the detected flow rate value (R1). However, the procedure for determining the tendency of increase and decrease will be described later.

The valve control information gradient computation program P10 determines a coefficient of association (A) indicating the association of the detected flow rate value (R1) and the valve drive control information (V1), which are stored in any one or two types of the test information sampling tables K2, K3, . . . in which the test sampling information is stored in association with a plurality of types of the flow rate set values (R0). The coefficient of association (A) is determined as a gradient of a straight line when any two types of test information sampling tables have been selected. The straight line connects between the intersection point coordinates defined by associating the detected flow rate value (R1) and the valve drive control information (V1), which are stored in the two types of test information sampling tables, with two-dimensional coordinate axes in a temporal sequence of their storage, respectively.

The coefficient of association (A) is determined from one test information sampling table as a gradient of a straight line connecting between intersection point coordinates and the origin coordinates (0,0). The intersection point coordinates are defined by associating the detected flow rate value (R1) and the valve drive control information (V1), which are stored in the test information sampling table associated with any one of the flow rate set values (R0), with two-dimensional coordinate axes in a temporal sequence of their storage, respectively. Note that when two or more types of flow rate set values (R0) are transmitted from the external system 9, the coefficient of association (A) is preferably determined from any two types of test information sampling tables.

For example, the valve control information gradient computation program P10 can be used to determine the coefficient of association (A) from two test information sampling tables as follows.

First, sequentially calculated are a differential value Rr between the detected flow rate values (R1) stored in temporal sequence in two test information sampling tables and a differential value Vr between pieces of valve drive control information (V1) stored in a temporal sequence similarly therein. Then, from the resulting differential value Rr and differential value Vr, the coefficient of association (A) is determined as (A)=(the differential value Rr)/(the differential value Vr). The coefficient of association (A) is determined up to the number of the detected flow rate values (Ri) (or the pieces of valve drive control information (V1)) stored in the test information sampling tables.

On the other hand, the valve control information gradient computation program P10 may be used to determine the aforementioned coefficient of association (A) from one test information sampling table associated with the flow rate set value (R0). Alternatively, the coefficient of association (A) may also be determined by selecting the test information sampling tables associated with any two types of flow rate set value (R0). This determination may be made based on either one of (1) to (3) below.

(1) If the semiconductor manufacturing line with the flow controller 1 of the present invention is designed to provide flow control based on one type of flow rate set value (R0), then the coefficient of association (A) is determined from one test information sampling table.

(2) If the semiconductor manufacturing line with the flow controller 1 of the present invention is designed to provide flow control based on two or more types of flow rate set values (R0), then the coefficient of association (A) is determined from any two types of test information sampling tables.

(3) The semiconductor manufacturing line with the flow controller 1 of the present invention may also be designed to provide flow control based on two or more types of flow rate set values (R0). In this case, for example, based on a control signal from the external system 9 or an input signal from the monitor device 29, the coefficient of association (A) is also determined from a test information sampling table associated with one specified flow rate set value (R0).

The aforementioned test sampling information increase/decrease tendency determination program P9 and the valve control information gradient computation program P10 are required in order to perform pre-processing for testing of the flow controller 1.

The flow rate test program P11 serving as the flow rate test means determines information (test information) regarding accuracy 5 with which the flow controller 1 controls the flow rate through the fluid path 4. The flow rate test program P11 includes, as subprograms, a valve control difference computation program P11a and a flow rate difference computation program P11b. What the flow rate test program P11 does will be described later.

The flow rate correction program P12 works as follows when the flow rate control program P6 of the control means 8 has delivered new valve drive control information (V1) to the flow control valve mechanism 7 (the laminated piezoelectric device 15). That is, the program P12 determines the valve drive control information on flow rate correction to be used to correct the flow rate through the fluid path 4, and then delivers the resulting valve drive control information to the flow control valve mechanism 7.

The valve property information registration program P13 works at the initial stage, for example, when the flow controller 1 is installed for the first time in the semiconductor manufacturing apparatus 2. As described above, the program P13 registers with the RAM 23 the valve property information table K1, having the data structure shown in FIG. 4, from the data collected through a test operation under actual conditions. The valve property information registration program P13 is also used to re-register the valve property information table K1 with the RAM 23 even after the flow controller 1 has been installed in the semiconductor manufacturing apparatus 2.

The monitoring program P14 transmits in real time various types of information to the monitor device 29. The information includes the detected flow rate value (R1), the detected pressure value (P1), and the temperature detection value, which the flow controller 1 has collected during the operation of the semiconductor manufacturing apparatus 2, and the test information determined by computational operation. Upon reception of these pieces of information, the monitor device 29 graphically displays the received information in temporal sequence on a display device. Note that as described above, the monitor device 29 maybe installed as required for operation.

The software timer P15 is a program which makes use of program processing for counting elapsed time. The software timer P15 is controlled by the main control program Pm to execute its counting of elapsed time. However, instead of the software timer P15, a hardware timer may also be mounted in the control means (board) 8.

[Procedures of Flow Control and Testing]

Now, with reference to the flowcharts shown in FIG. 9 to FIG. 11, a description will be given to the procedure according to a first embodiment in which the control means 8 of the flow controller 1 tests the accuracy of flow rate control while at the same time providing the flow rate control of the fluid passing through the fluid path 4 using the aforementioned control programs.

Figure 9:
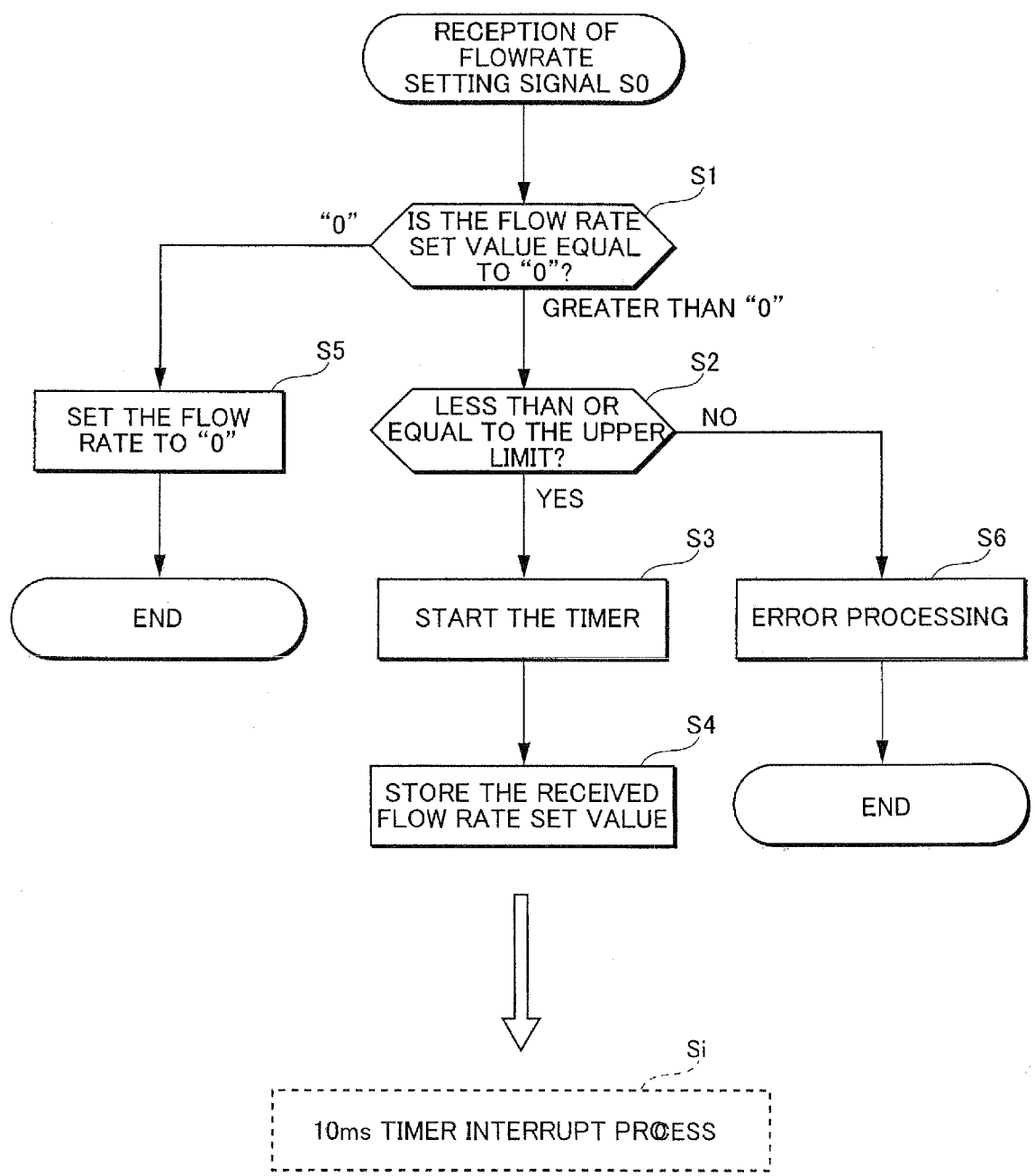
FIG. 9 is a flowchart showing an example of the sequence of reception steps executed by the control means when a signal indicative of a flow rate set value is received from the external system shown in FIG. 1.

FIG. 9 shows a flowchart in which the main control program Pm of the control means 8 receives from the external system 9 the flow rate set value (R0) carried on the flow rate setting signal S0 by communication interrupt, and then determines the type of the received flow rate set value (R0). FIGS. 10 and 11 each show a flowchart of the procedure in which the main control program Pm tests the accuracy of flow control while providing control to the flow rate through the fluid path 4 based on the flow rate set value (R0) received from the external system 9.

In the following descriptions, it is described by way of example that the flow rate set value (R0) which the external system 9 transmits to the flow controller 1 as the flow rate setting signal S0 is any one type of digital values among the plurality of flow rate set values that fall within the range of "0 to 100 cc/min". Note that the flow rate set value (R0) being "0" indicates the flow rate of the fluid passing through the fluid path 4 being set at "0", and the R0 being "100" indicates the flow controller 1 providing a control to allow the maximum flow rate (the full-scale flow rate) through the fluid path 4, for example, to be 100 cc/min.

The external system 9 transmits the flow rate set value (R0) to the flow controller 1 as the flow rate setting signal S0. For example, as shown in FIG. 6, when a predetermined time (T1) has elapsed after "0 cc/min" was transmitted following the operation (such as deposition) by the semiconductor manufacturing apparatus 2 such as the CVD apparatus, the flow rate set value (R0) "60 cc/min" is transmitted for deposition for one batch. Based on this, the flow rate control program P6 of the control means 8 provides a control for the duration of time T2 to regulate to "60 cc/min" the flow rate of the fluid passing through the fluid path 4 that communicates with a chamber of the CVD apparatus. Then, after time T2 has elapsed, the external system 9 transmits "0 cc/min" as the flow rate setting signal S0. Then, after time T3 has elapsed, the external system 9 transmits, for example, "60 cc/min" to the flow controller 1 as the flow rate set value (R0) for deposition for one new batch.

FIG. 9 shows a flowchart of the reception procedure which the main control program Pm of the flow controller 1 executes when the flow controller 1 receives the flow rate set value (R0) from the external system 9. In the description below, the contents of the reception process will be described step by step.

(Step S1)

The main control program Pm determines whether the flow rate set value (R0) received from the external system 9 as the flow rate setting signal S0 is "0" (0 cc/min). If the result of the determination shows that R0 is greater than "0", then the process proceeds to step S2. On the other hand, if R0 is "0", then the process proceeds to step S5.

(Step S2)

It is determined whether the received flow rate set value (R0) is greater than a predetermined upper limit, for example, "100 cc/min". If the result of the determination shows that it is less than or equal to the upper limit, then the process proceeds to step S3. On the other hand, if it is greater than the upper limit, then the process proceeds to step S6.

(Step S3)

The process activates (starts) the software timer P15 to count the elapsed time, for example, in seconds.

(Step S4)

The process stores the received flow rate set value (R0) in the RAM 23. After the processing of step S4 has been completed, the main control program Pm passes the control to a software interrupt process (10 msec timer interrupt) Si shown in FIG. 10.

(Step S5)

The flow rate control program P6 of the control means 8 provides control to regulate the flow rate through the fluid path 4 to "0" (i.e., "closing" of the flow control valve mechanism 7). The controlling of the flow rate to "0" shows that "150 V (or 0 V)" is applied as a valve drive voltage value (indicative of the valve drive control information) to the laminated piezoelectric device 15, thereby lowering the flow control valve 12 to reduce the flow rate through the fluid path 4 to "0". After the processing of step S5 has been completed, the process for receiving the flow rate set value (R0) is ended.

On the other hand, to control the flow rate through the fluid path 4 to "0", the valve drive control information (V1) needs to be applied to the laminated piezoelectric device 15 depending on whether the flow control valve made up of the laminated piezoelectric device 15 is of the normally-open type or the normally-closed type. For example, in the case of the normally-open type, "150 V" is applied to the laminated piezoelectric device 15 to effect a control to "close" the flow control valve mechanism 7. On the other hand, in the case of the normally-closed type, "0 V" is applied to the laminated piezoelectric device 15 to effect a control to "close" the flow control valve mechanism 7.

However, a control program can also be used to open or close the flow control valve mechanism 7 regardless of whether the flow control valve is of the normally-open or normally-closed type. To this end, for example, the control means 8 may deliver "0 V" to the valve drive circuit 20 in order to "close" the flow control valve mechanism 7. On the other hand, in order to "fully open" the flow control valve mechanism 7, the control means 8 may provide a control to deliver "5 V" to the valve drive circuit 20. Also, the valve drive circuit 20 is provided with a drive voltage converter circuit for accommodating to the type of the open/close control provided to the flow control valve. The drive voltage converter circuit is provided with a circuit for applying "150 V" to the laminated piezoelectric device 15 to "close" the flow control valve mechanism 7 that includes a flow control valve of the normally-open type. On the other hand, if the flow control valve is of the normally-closed type, a circuit is similarly provided for applying "0 V" to "close" the flow control valve mechanism 7.

(Step S6)

The process performs error processing to terminate the reception processing of the flow rate set value (R0) because the flow rate set value (R0) greater than a predetermined value has been sent from the external system 9.

A description will now be made to the procedure of flow control and testing, which is executed by the 10 msec timer interrupt processing Si (hereinafter referred to as the timer interrupt processing) shown in FIGS. 10 to 11.

The timer interrupt processing Si is activated at predetermined time intervals, for example, every 10 msec based on the control provided by the main control program Pm, until the next new flow rate set value (R0) is transmitted from the external system 9. Next, the procedure of the timer interrupt processing Si will be described in the order of the steps shown in FIGS. 10 to 11.

(Step S11)

The process activates the flow rate detection signal input program P2, allowing the control means 8 to receive, as the flow rate detection signal S1, the information regarding the detected flow rate value (R1) through the fluid path 4 provided by the flow rate detection means 5 at the present point in time. The process then stores the received detected flow rate value (R1) in the RAM 23. The detected flow rate value (R1) is received, for example, as any one of the voltage values 0 to 5 V by the control means 8. The flow rate detection signal input program P2 converts the received voltage value to a present flow rate value, for example, to a detected flow rate value (R1) expressed in "cc/min" to be stored in the RAM 23. On the other hand, voltage values from 0 to 5 V received by the control means 8 as the detected flow rate value (R1) may also be used in the processing below without making any change to it.

(Step S12)

The process allows the pressure detection signal input program P3 serving as the detected pressure value reception means to receive the detected pressure value (P1) provided by the pressure detection means 6 as the pressure the detection signal S2. The process then stores the received detected pressure value P1 in the RAM 23. Note that the detected pressure value (P1) received by the control means 8 is any one voltage value expressed, for example, by 0 to 5 V. On the other hand, the pressure detection signal input program P3 converts the voltage value to, for example, a detected pressure value (P1) expressed by "0.2 MPa" for storage in the RAM 23.

(Step S13)

The flow rate control program P6 performs computational processing to determine the valve drive control information (V0) for regulating the flow rate through the fluid path 4 to the flow rate set value (R0) received from the external system 9. Then, the program P6 delivers the resulting valve drive control information (V0) to the valve drive circuit 20 as the valve drive signal S3. As described above, upon receiving the valve drive control information (V0) from the control means 8, the valve drive circuit 20 converts the valve drive control information (V0) into the valve drive control information (V1) (the valve drive voltage value) to be applied as the valve drive voltage signal S4 to the laminated piezoelectric device 15. Then, the resulting valve drive control information (V1) is applied (delivered) to the laminated piezoelectric device 15.

Furthermore, in step S13, the valve drive control information input program P5 allows the valve drive control information (V1) applied by the valve drive circuit 20 to the laminated piezoelectric device 15 to be supplied to the control means 8 as the valve drive voltage signal S6. Then, the program P5 temporarily stores the received valve drive control information (V1) in the RAM 23. On the other hand, the processing for storing the valve drive control information (V1) applied to the laminated piezoelectric device 15 in the RAM 23 may be performed by determining the valve drive control information (V1) from the valve drive control information (V0) computed by the flow rate control program P6 and then storing the resulting valve drive control information (V1) in the RAM 23.

Note that in step S13, the flow rate control program P6 can employ, for example, the PID operation to determine the valve drive control information (V0), which is the valve drive control information corresponding to the valve drive control information V1 and delivered to the valve drive circuit 20.

The PID operation can be performed to determine the valve drive control information (V0) as follows. Namely, first determined is the differential value between the flow rate set value (R0) received from the external system 9 and the detected flow rate value (R1) received in step S11. Then, referring to the reference control information for the PID operation pre-registered in the RAM 23, the valve drive control information (V0) is determined from the resulting differential value. In this process, the PID operation may be used to determine the valve drive control information (V1) to be applied to the laminated piezoelectric device 15. Then, based on the resulting valve drive control information (V1), the valve drive control information (V0) to be delivered to the valve drive circuit 20 may be determined.

(Step S14)

The process computes the amount of difference D1 (D1=the absolute value of (R0−R1)) between the flow rate set value (R0) (for example, 60 cc/min) specified by the flow rate setting signal S0 from the external system 9 in step S1 above and the detected flow rate value R1 received in the above step S11. It is then determined whether the differential value D1 is equal to "0" or less than or equal to a pre-determined value a, for example, "0.1 cc/min". If it is determined in this determination process that the amount of difference D1 is equal to or less than α, then the process proceeds to step S15. On the other hand, if it is determined that D1>α, the process returns to the timer interrupt processing Si.

In the processing of step S14, judgment is made as to if it is allowed to determine that the detected flow rate value (R1) of the flow rate through the fluid path 4 at the present point in time coincides with the flow rate set value (R0) specified by the external system 9 or has reached, for example, a stable state equal to or less than the flow rate set value (R0) within "0.1 cc/min". If the aforementioned amount of difference D1 is determined to be greater than the value α, then the process returns to the timer interrupt processing Si. It will then be re-determined in the next timer interrupt processing Si which is activated every 10 msec, whether the flow rate is in the stable state or not.

The processing in step S14 is performed for the following reasons. For example, control may be provided to the pressure controller disposed on the gas pipe 3 between a process gas source and the flow controller 1, so that the flow rate of the fluid passing through the fluid path 4 is regulated from the state at "0" ("0 cc/min") to, for example, "60 cc/min" that is the flow rate set value (R0). In this case, the flow rate through the fluid path 4 does not immediately reach the stable flow rate at "60 cc/min" or near "60 cc/min"; it typically takes about 1 second to a few seconds until the stable flow rate is reached. Accordingly, the testing of the accuracy with which the flow controller 1 provides a flow control would be meaningless unless it is conducted after the flow rate of the fluid passing through the fluid path 4 is determined to have reached a value near the flow rate set value (R0).

On the other hand, when it is determined in the processing of step S14 that the flow rate through the fluid path 4 has been stabilized, the aforementioned processing of step S3 maybe conducted, i.e., the software timer P15 may be activated (started) to count an elapsed time.

(Step S15)

The process determines whether "1" is stored in a test flag defined in the RAM 23. If the determination result shows that "1" is stored, the process proceeds to step S16. On the other hand, if "0" is stored, the process proceeds to step S17. This test flag serves as information indicative of whether the equipment aging mentioned above has caused a non-negligible amount of deviation from the flow rate set value (R0) supplied by the external system 9 to occur in the flow control currently provided by the flow controller 1 for the fluid path 4. Note that this test flag is supplied with "1" when it is determined based on the processing of steps S24 to S25 that the testing is required to execute, as will be described later.

(Step S16)

The flow rate test program P11 produces test information for testing the accuracy of the flow control provided by the flow controller 1. Furthermore, in step S16, the resulting test information is transmitted to the external system 9.

The test information produced by the flow rate test program P11 includes a valve control difference and a flow rate difference, as will be shown below.

The valve control difference serving as the test information is determined by the valve control difference computation program P11a acting as the flow rate test means. The valve control difference is indicative of the amount of difference between the valve drive control information (V1) delivered by the control means 8 to the laminated piezoelectric device 15 and the reference valve drive control information (Vsi) determined with reference to the valve property information table K1. The reference valve drive control information (Vsi) is associated with both the detected flow rate value (R1) and the detected pressure value (P1) at a point in time at which the flow rate control program P6 determined the valve drive control information (V1). Note that the reference valve drive control information (Vsi) is determined by the valve property information reference program P8.

Accordingly, the valve control difference is indicative of the amount of deviation between the valve drive control information (V1) delivered to the laminated piezoelectric device 15 at the present point in time and the valve drive control information (Vsi) determined as reference test data. The reference test data is determined from the detected flow rate value (R1) and the detected pressure value (P1) available when the valve drive control information (V1) is delivered. This amount of deviation can be inferred as caused by equipment aging.

The valve control difference can be determined using the valve control difference computation program P11a as follows.

The amount of difference ((V1)−(Vsi)) between the valve drive control information (V1) and the reference valve drive control information (Vsi) is determined. Here, the information (V1) is delivered to the laminated piezoelectric device 15 in the processing of step S13 in order to control the flow rate through the fluid path 4 to the flow rate set value (R0) received from the external system 9. The information (Vsi) is associated with both the detected flow rate value (R1) received in the processing of step S11 as information for determining the valve drive control information (V1) by operational processing and the detected pressure value (P1) received in the processing of step S12. As described above, the reference valve drive control information (Vsi) can be determined with reference to the valve property information table K1 shown in FIG. 4.

The valve property information reference program P8 is used to determine the reference valve drive control information (Vsi) associated with both the detected flow rate value (R1) and the detected pressure value (P1), with reference to the valve property information table K1. A description will now be given to this procedure with reference to the exemplary data provided in the valve property information table K1 shown in FIG. 4.

For example, suppose that the detected flow rate value (R1) received in the processing of step S11 is "60 cc/min", while the detected pressure value (P1) received in the processing of step S12 is "0.2 MPa". In this case, referring to the valve property information table K1 shown in FIG. 4, the valve property information reference program P8 determines the reference valve drive voltage (Vsi) associated with both the detected flow rate value (R1) (60 cc/min) and the detected pressure value (P1) (0.2 MPa). In this instance, the reference valve drive voltage (Vsi) is to be determined as "53.609 V" as shown in zone b of FIG. 4.

On the other hand, when the detected flow rate value (R1) is "57 cc/min" and the detected pressure value (P1) is "0.25 MPa", the reference valve drive voltage (Vsi) associated with both the detected flow rate value (R1) and the pressure value (P1) cannot be directly determined from the data registered with the valve property information table K. For this reason, a program for performing computational processing such as approximate linear interpolation (an approximate linear interpolation program) is used to determine the reference valve drive voltage (Vsi).

When the detected flow rate value (R1) is "57 cc/min" and the detected pressure value (P1) is "0.25 MPa", the reference valve drive voltage (Vsi) can be determined using the approximate linear interpolation program with reference to the valve property information table K1. This can be done, for example, by programming the procedures set forth in (1) to (3) below.

(1) Consider the reference detected flow rate values (Rs) "55 cc/min" and "60 cc/min" in the valve property information table K1 containing the aforementioned detected flow rate value (R1) "57 cc/min". Four reference valve drive voltages (Vs1) to (Vs4), for which the values (Rs) each correspond to the reference pressure values (Ps) "0.2 MPa" and "0.3 MPa" of the fluid, are determined from the valve property information table K1 and then stored in the RAM 23.

(2) For the aforementioned detected flow rate value (R1) "57 cc/min", the valve drive voltage (Vs5) corresponding to the detected pressure value (P1) "0.2 MPa" and the valve drive voltage (Vs6) corresponding to "0.3 MPa" are determined by linear interpolation at the ratio of (57−55)/(60−55) with reference to the valve property information table K1 and stored in the RAM 23.

(3) The resulting values (Vs5) and (Vs6) from (2) above are used to compute a value of ((Vs6)−(Vs5)), which is then multiplied by (0.25−0.2)/((0.3)−(0.2)) for linear interpolation, thereby determining the reference valve drive voltage (Vsi) for the detected pressure value (P1) "0.25 MPa".

On the other hand, the flow rate difference serving as the test information indicates the amount of difference between the detected flow rate value (R1) at the current point in time and a reference flow rate (Rsi). Here, the reference flow rate (Rsi) is determined from the valve property information table K1 based on the valve drive control information (V1) which has been computed based on the detected flow rate value (R1) and delivered to the laminated piezoelectric device 15. That is, the flow rate difference shows the amount of deviation between the detected flow rate value (R1) actually measured and the test flow rate that is determined from the valve drive control information (V1) delivered at that time, when the flow controller 1 is controlling the flow rate through the fluid path 4 to the flow rate set value (R0).

The aforementioned flow rate difference can be computed using the flow rate difference computation program P11b serving as the second flow rate test means, by employing the procedure which is to be described below.

First, the valve property information reference program P8 is used to determine the reference flow rate (Rsi) with reference to the valve property information table K1. The reference flow rate (Rsi) is associated with both the detected pressure value (P1) received in the processing of step S12 and the valve drive control information (V1) delivered to the laminated piezoelectric device 15 in the processing of step S13. Then, the differential value between the detected flow rate value (R1) received in the processing of step S11 and the reference test flow rate (Rsi) is determined, and the resulting differential value is employed as the flow rate difference (the amount of flow rate deviation). The amount of flow rate deviation can be inferred to have occurred due to equipment aging. On the other hand, to determine the reference flow rate (Rsi) using the valve property information reference program P8, the aforementioned approximate linear interpolation program is activated as required.

Furthermore, instep S16, the flow rate test program P11 sends the valve control difference and the flowrate difference, determined in the aforementioned processing, to the external system 9. In addition, these pieces of information may also be transmitted to the monitor device 29.

When having received the detected flow rate value (R1), the detected pressure value (P1), the valve drive control information (V1), and various types of information including the valve control difference and the flow rate difference from the flow controller 1 in the aforementioned step S13 and step S16, the external system 9 displays these received pieces of information on a monitor device of the monitoring system included in the external system 9, for example, in temporal sequence. A supervisor of the monitoring system views this display, thereby recognizing in real time how much deviation has occurred in flow control with respect to the flow rate set value (R0).

(Step S17)

The main control program Pm determines whether the time value counted by the software timer P15 has reached the predetermined time value. If the result of the determination shows that the predetermined time value has been reached, the process proceeds to step S18. If the predetermined time value is not yet reached, the process returns to the timer interrupt processing Si. Note that the predetermined time value indicates the time value that is required to activate the test information sampling program P7, to collect the test sampling information, and then to associate it with the received flow rate set value (R0) received in the test information sampling table defined in the RAM 23.

(Step S18)

The test information sampling program P7 associates the test sampling information with the flow rate set value (R0) received from the external system 9 for storage in any one of the test information sampling tables, for example, K2 or K3, which are defined in the RAM 23. Here, the test sampling information is made up of the three types of information; the detected flow rate value (R1) received from the flow rate detection means 5 in the processing of step S11, the detected pressure value (P1) received from the pressure detection means 6 in the processing of step S12, and the valve drive control information (V1) delivered to the laminated piezoelectric device 15 in the processing of step S13. Then, each time the test sampling information is stored in any one of the test information sampling tables, such as K2 or K3, associated with the flow rate set value (R0), the number of pieces of test sampling information (the number of sampled pieces) stored in each of the test information sampling tables such as K2 or K3 is counted. Then, the count value is stored in the RAM 23. Note that an exemplary data structure of information stored in the test information sampling tables such as K2 or K3 is as shown in FIG. 7 or FIG. 8, as described above.

Furthermore, in step S18, the process transmits, to the external system 9, the detected flow rate value (R1) received in step S11, the detected pressure value (P1) received in step S12, and the valve drive control information (V1) applied to the laminated piezoelectric device 15 in step S13.

(Step S19)

It is determined whether the number of pieces of test sampling information stored in each of the test information sampling tables such as K2 or K3 associated with each of the multiple predetermined flow rate set values (R0) has reached a predetermined upper limit, for example, "100", respectively. If the result of the determination shows that the predetermined number has been reached, then the process proceeds to step S20, whereas if the predetermined number is determined to be not yet reached, the process returns to the timer interrupt processing Si. Note that although the upper limit of the number of stored entries also depends on the operational status of the semiconductor manufacturing apparatus 2, it may be set, for example, to such an upper limit that the number of all the stored pieces of test sampling information corresponding to a plurality of flow rate set values (R0) will reach in one week or a few weeks.

Note that in the processing of step S18, a plurality of pieces of test sampling information may be sampled for the flow rate set values (R0) for one batch and then stored in the test information sampling tables such as K2 or K3. In this case, for example, the test information sampling program P7 may be used to perform the processing as described below.

That is, at the point in time at which the count value of the software timer P15 has reached the predetermined time value in the aforementioned processing of step S17 and the processing of step S18 has been completed, the count value of the software timer P15 is reset to "0". Thereafter, the software timer P15 is activated to count elapsed time, and then the process proceeds to step S19. While the timer processing Si is recurrently executed as such, the elapsed time reaches the predetermined time value, so that the processing of step S18 is executed. This is to say that the plurality of pieces of test sampling information have been stored in temporal sequence in any one of the test information sampling tables such as K2 or K3 associated with the flow rate set values (R0).

(Step S20)

The processing in step S20 to step S24 is concerned with analyzing the data which constitutes the test sampling information stored in the test information sampling tables such as K2 or K3, and then determining whether there has occurred any non-negligible deviation in flow control due to equipment aging. This processing is a means (method) that is characteristic of the flow controller 1.

In step S20, the test sampling information increase/decrease tendency determination program P9 is used to analyze the valve drive control information (V1) and the detected pressure value (P1) stored in each of the test information sampling tables such as K2 or K3 in association with the flow rate set value (R0). To be more specific, it is determined whether there is a tendency of increase or decrease in the valve drive control information (V1) and the detected pressure value (P1) stored in a temporal sequence, i.e., there has occurred any effect on flow control due to the aforementioned aging.

Now, with reference to FIG. 7, a description will be made to an exemplary procedure in which the test sampling information increase/decrease tendency determination program P9 is used to determine the tendency of increase or decrease as mentioned above. The description will be given with reference to, for example, the test information sampling table K2 associated with a flow rate set value (R0) of "60 cc/min", as set forth in (1) to (5) below.

(1) As described above, the pieces of valve drive control information (V1) stored in the test information sampling table K2 are arranged in the order of their storage in the RAM 23 (in temporal sequence of storage). First, neighboring pieces of valve drive control information (V1) adjacent to each other in temporal sequence of storage are processed. That is, in the example shown in FIG. 7, the valve drive control information (V1) corresponding to the flowrate set value identification information "R60-1" is subtracted from the valve drive control information (V1) corresponding similarly to the flow rate set value identification information "R60-2" to obtain the difference (differential) value (Sv), which is then stored in the RAM 23.

(2) Likewise, the valve drive control information (V1) corresponding to the flow rate set value identification information "R60-2" is subtracted from the valve drive control information (V1) corresponding similarly to the flow rate set value identification information "R60-3" to obtain the difference (differential) value (Sv), which is then stored in the RAM 23.

(3) From now onward, two neighboring pieces of valve drive control information (V1) adjacent in temporal sequence to each other are processed in the similar manner, i.e., subtracted one from the other, until the identification information "R60-n" is reached, to find their respective differential value (Sv), which is then stored in the RAM 23.

(4) It is then determined whether all the resulting differential values (Sv) from the processing in (1) to (3) above are "positive (plus)" or "negative (minus)", and the results are then stored in the RAM 23 in association with the flow rate set value (R0).

If all the differential values (Sv) obtained by executing the procedures set forth in (1) to (4) above are "positive", then it can be determined that the valve drive control information (V1) tends to increase (have an upward tendency) due to aging for the period of sampling of the valve drive control information (V1). On the other hand, if all are "negative", then the valve drive control information (V1) can be determined similarly to tend to decrease (have a downward tendency).

Subsequently, the test sampling information increase/decrease tendency determination program P9 is used to perform the processing of (5) below.

(5) Concerning the detected pressure values (P1) stored in the test information sampling table K2, the similar procedure to those set forth in (1) to (4) above is taken to find the differential value (Sp) between the neighboring values (P1) stored in sequence. Then, it is determined whether the resulting differential value (Sp) has an upward tendency or a downward tendency. Then, if all the differential values (Sp) obtained by executing the processing set forth in (5) are "positive", then it can be determined that the detected pressure value (P1) tends to increase (have an upward tendency) due to aging for the period of sampling of the detected pressure value (P1). On the other hand, if all are "negative", then it can be similarly determined that the detected pressure value (P1) tends to decrease (have a downward tendency).

In step S20, based on the procedure set forth in (1) to (5) above, it is determined whether the valve drive control information (V1) and the detected pressure value (P1) stored in all the test information sampling tables such as K2 or K3 associated with the flow rate set value (R0) have an upward tendency or a downward tendency.

(Step S21)

Concerning both the valve drive control information (V1) and the detected pressure value (P1) which have been determined in the processing of step S20 and stored in the test information sampling tables such as K2 or K3 associated with all the flow rate set values (R0), it is determined whether they have the same tendency of increase or decrease, i.e., if all have an "upward tendency" or a "downward tendency". If the result of the determination shows that they have the same increase/decrease tendency, then the process proceeds to step S22, whereas if it is determined that they do not have the same tendency, then the process returns to the timer interrupt processing Si.

In step S21, it may be determined that both the valve drive control information (V1) and the detected pressure value (P1) stored in the test information sampling tables such as K2 or K3 have an upward tendency or a downward tendency. This determination shows that with respect to the flow rate set value (R0) received from the external system 9, the valve drive control information (V1) delivered to the laminated piezoelectric device 15 and the detected pressure value (P1) of the fluid in the fluid path 4 tend to increase or decrease in temporal sequence. This makes it possible to infer that there has occurred a deviation in the actual flow control from the flow rate set value (R0) to which the flow controller 1 controls the flow rate through the fluid path 4. Here, the deviation is thought to result from, for example, adhesion of chemical products to the inside of the pipeline due to the aforementioned equipment aging; adhesion of chemical products to the sensor pipe or the bypass pipe, which constitute the flow rate sensor; or degradation in performance of the laminated piezoelectric device 15 serving as an actuator and provided in the flow control valve mechanism 7. On the other hand, both the valve drive control information (V1) and the detected pressure value (P1) stored in the test information sampling tables such as K2 or K3 may be determined to have an upward tendency and a downward tendency at the same time. In this case, since it can be determined that there has not occurred equipment aging, the process returns from step S21 to the timer interrupt processing Si.

(Step S22)

The valve control information gradient computation program P10 is used to select two types of test information sampling tables stored in the RAM 23, and then to perform (processing 1) and (processing 2), to be described below. Note that when the test information sampling tables such as K2, K3, and K4 associated with three or more types of flow rate set values (R0) are stored in the PAM 23, those test information sampling tables corresponding to any two types of flow rate set values (R0) are selected. This choice of any two types of flow rate set values (R0) may be made for the two types of flow rate set values, i.e., the highest flow rate set value (R0) and the lowest flow rate set value (R0).

(Processing 1)

In relation to those test information sampling tables associated with the resulting two types of flow rate set values (R0), for example, the test information sampling tables K2 and K3 shown in FIGS. 7 and 8, the amount of difference Vr is computed between the pieces of valve drive control information (V1) stored in temporal sequence corresponding to the two types of flow rate set values (R0). Now, with reference to the test information sampling tables K2 and K3 shown in FIGS. 7 and 8, this exemplary calculation will be described as follows.

First, the difference (Vr−1) or the difference Vr between the pieces of valve drive control information (V1) corresponding to the flow rate set value identification information "R60-1" sampled and stored in temporal sequence as shown in FIG. 7 and "R20-1" obtained similarly in temporal sequence as shown in FIG. 8. Then, likewise, the difference (Vr−2) is determined between the pieces of valve drive control information (V1) which correspond to the flow rate set value identification information "R60-2" and "R20-2". From now onward, the difference (Vr−n) between the pieces of valve drive control information (V1) corresponding to the flow rate set value identification information "R60-$n$" and "R20-$n$" is sequentially calculated in a similar manner and then stored in the RAM 23 in temporal sequence.

(Processing 2)

In the same manner as in (Processing 1) above, in relation to the two test information sampling tables K2 and K3, the differences Rr between the pieces in temporal sequence of storage of the detected flow rate value (R1) such as the difference (Rr−1), the difference (Rr−2), . . . , and the difference (Rr−n) are sequentially calculated and then stored in the RAM 23 in temporal sequence.

(Step S23)

In step S22 above, the differences Rr such as the difference (Rr−1), the difference (Rr−2), . . . , and the difference (Rr−n) as well as the differences Vr such as the difference (Vr−1), the difference (Vr−2), . . . , and the difference (Vr−n) are sequentially calculated and stored in temporal sequence following the procedures set forth in (Processing 1) and (Processing 2). Concerning these differences, the valve control information gradient computation program P10 is used to sequentially calculate the coefficient of association (A) indicating the association of the difference Rr and the difference Vr corresponding to each other in temporal sequence. The coefficient of association (A) is determined as (the difference (Rr−1)/the difference (Vr−1)), (the difference (Rr−2)/the difference (Vr−2)), . . . , and (the difference (Rr−n)/the difference (Vr−n)), and the resulting values are stored in the RAM 23.

Figure 16:
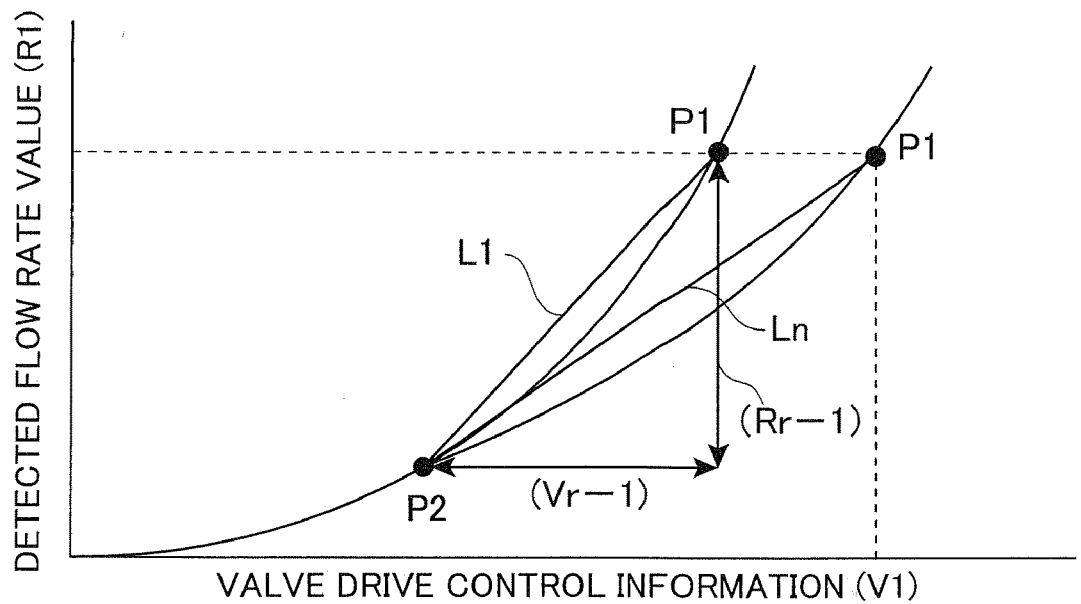
FIG. 16 is an explanatory graph showing an exemplary gradient of the straight line associated with a coefficient of association (A) determined by a valve control information gradient computation program P10 shown in FIG. 5.

The values of the coefficient of association (A) sequentially computed by the valve control information gradient computation program P10 are used, as shown in FIG. 16, to obtain the gradients of straight lines L1, . . . , and Ln on the two-dimensional coordinate system with the X axis representing the valve drive control information (V1) associated with two types of flow rate set values (R0) and with the Y axis representing the detected flow rate value (R1). The straight lines L1, . . . , and Ln connect each between two intersections P1 and P2, which are provided by the values of the valve drive control information (V1) and the flow rate set value (R1) corresponding to two flow rate set values (R0) in temporal sequence.

(Step S24)

It is determined whether the value of the coefficient of association (A) computed in the processing of step S23 is out of a predetermined threshold value range S. The threshold value range S is defined, for example, as S=(0.30 to 0.35). If the result of the determination shows that the value has exceeded the predetermined threshold value range S, then the process proceeds to step S25, whereas if it is determined that the value is within (has not exceeded) the threshold value range S, then the process proceeds to step S26. Note that the threshold value range S is set to an appropriate value for each of two types of flow rate set values (R0) based on the reference valve drive control information (Vs) and the reference flow rate (Rs) stored in the valve property information table K1 shown in FIG. 4.

The value of the aforementioned coefficient of association (A) can be determined to be out of the predetermined threshold value range S or not, for example, by employing the following methods.

That is, when a predetermined number, for example, one or two of the values of the multiple coefficients of association (A) computed in the aforementioned procedure are out of the threshold value range S, it may be determined that the coefficient of association (A) is out of the threshold value range S. Alternatively, the difference between the maximum and minimum values of plurality of coefficients of association (A) may be computed, so that if this difference is greater than a predetermined value, then it may be determined that the coefficient of association (A) is out of the predetermined threshold value range S.

On the other hand, the value of the coefficient of association (A) is determined in step S24 to be out of the threshold value range S or not, because of the following reasons. Once equipment aging has occurred, there then occurs a slight change in the valve drive control information (V1) and the flow rate set value (R1) even when the control means 8 controls the flow rate through the fluid path 4 toward the flow rate set value (R0). Thus, the resulting values of the multiple coefficients of association (A) also change with time.

On the other hand, if there has occurred no equipment aging or there has occurred only a slight aging, the coefficient of association (A) has an extremely low variation. This is because as described above, an appropriate value is set to the threshold value range S for any two types of flow rate set values (R0) based on the reference valve drive control information (Vs) and the reference flow rate (Rs) stored in the valve property information table K1 shown in FIG. 4, thereby allowing the value of the coefficient of association (A) to fall within the threshold value range S when there has occurred no equipment aging or there has occurred only a slight aging.

Accordingly, the determination in step S21 above and the determination in step S24 of whether the value of the coefficient of association (A) is out of the predetermined threshold value range S are executed, thereby making it possible to determine with improved reliability that there has occurred a non-negligible deviation in flow control due to equipment aging.

Furthermore, as described above, the coefficient of association (A) is determined as the gradient of a straight line connecting between intersection point coordinates defined by associating the detected flow rate value (R1) and the valve drive control information (V1) on the two-dimensional coordinate axes in a temporal sequence of their storage, respectively. Here, the detected flow rate value (R1) and the valve drive control information (V1) constitute the test sampling information associated with any two types of flow rate set values (R0). This makes it possible to know degradation in flow control due to equipment aging with improved accuracy. This is because once equipment aging has occurred, the detected flow rate value (R1) and the valve drive control information (V1) can be inferred as tending to increase or decrease in the same manner in temporal sequence. Thus, a change in the gradient of a straight line connecting between the intersection point coordinates is found, where the coordinates are defined by associating the detected flow rate value (R1) and the valve drive control information (V1), constituting the test sampling information associated with the two types, in a temporal sequence of their storage with the two-dimensional coordinate axes. The resulting change is used to determine whether there has occurred equipment aging, thereby allowing the occurrence of the aging to be known with improved accuracy.

Suppose that an external system transmits three or more types of flow rate set values (R0) to the flow controller 1 in temporal sequence based on the operational schedule of the semiconductor manufacturing apparatus 2. In this case, a choice may be made among the pieces of test sampling information associated with the aforementioned two types, for example, of the highest flow rate set value (R0) and the lowest flow rate set value (R0). This is because the tendency of temporal change in the coefficient of association (A) can be known with improved accuracy.

(Step S25)

It is determined that there has occurred a non-negligible deviation in flow control due to equipment aging with respect to the flow rate set value (R0). Thus, the flow rate test flag defined in the RAM 23 is set to "1". Once the flow rate test flag is set to "1", the processing of step S16 (see FIG. 10) above is executed when the next timer interrupt processing Si is activated, thereby computing the test information.

The determination made in step S24 that the value of the coefficient of association (A) is not out of the predetermined threshold value range S shows the two facts as stated below.

The first fact shows that as described above, there has occurred no equipment aging or there has occurred only a slight aging, and flow control is provided with high accuracy, thereby allowing the flow rate to agree with the flow rate set value (R0) received from the external system 9 or to be very close to it. The reason for this has already been mentioned above.

Figure 17:
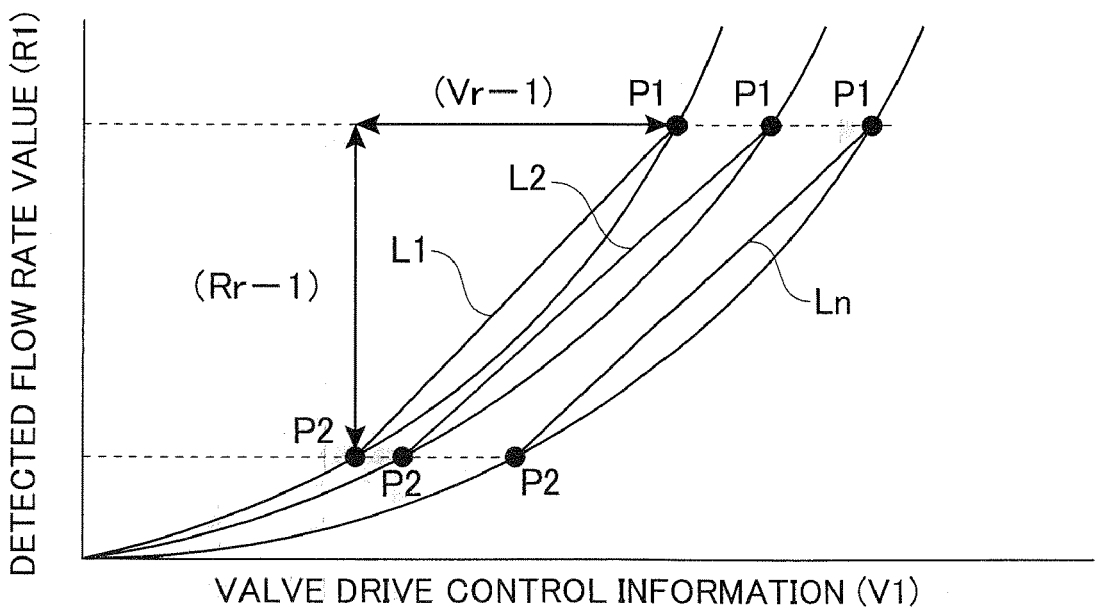
FIG. 17 is an explanatory graph showing similarly another exemplary gradient of the straight line associated with a coefficient of association (A) determined by the valve control information gradient computation program P10 shown in FIG. 5.

Secondly, a plurality of straight lines L1 and L2, . . . , Ln each connecting between two intersection points provided by the valve drive control information (V1) and the detected flow rate value (R1) which correspond to each other in temporal sequence on the aforementioned two-dimensional coordinate system are translated in temporal sequence due to equipment aging as shown in FIG. 17. This translation may occur because of the following reason. That is, for example, the reference control data, which is stored in the ROM 22 for the flow rate control program P6 to determine the valve drive control information (V1), may itself have deteriorated due to equipment aging. It can be thus determined that this deterioration has caused the straight lines such as L1 and L2 to translate in a given direction, for example, in the direction of the X axis (the valve drive control information (V1)).

(Step S26)

The process transmits the information regarding the coefficient of association (A), which has been computed in step S23 above by the valve control information gradient computation program P10, or the like to the external system 9. This causes the timer interrupt processing Si to be terminated, and after a predetermined period of time has elapsed, the process executes again the timer interrupt processing Si in step S11.

In the first embodiment of the present invention described above, in steps S1 to S26 above, the process controls the flow rate through the fluid path 4 to the flow rate set value (R0) transmitted from the external system 9. Meanwhile, the test sampling information for testing the accuracy of the flow control by the flow controller 1 is sampled in association with the flow rate set value (R0) and recorded in the test information sampling table defined in the RAM 23. The number of pieces of test sampling information stored in the test information sampling table in association with the flow rate set value (R0) may reach the predetermined upper limit. Then, the process analyzes the data that constitutes the sampled test sampling information, and determines whether there has occurred a variation in the flow control due to equipment aging with respect to the flow rate set value (R0) specified by the external system 9. If it is determined that there has occurred a non-negligible variation, i.e., a deviation in flow control, then when the flow controller 1 provides new flow rate control, the process is to test its accuracy. Then, the process transmits the test information obtained from this testing to the external system 9.

As can be seen from this, in the first embodiment of the present invention, while the flow rate through the fluid path 4 is being controlled to the flow rate set value (R0), the accuracy of flow control is automatically tested once in a day, a few days, one week, or a few weeks. Furthermore, since the information regarding the test results is provided to the upper-level monitoring system (the external system 9), a quick action can be taken even when there has occurred a non-negligible deviation in the amount of flow rate control due to equipment aging.

A description will now be made to a second embodiment of the present invention. The second embodiment features the means provided to correct the flow rate through the fluid path 4 based on the flow rate test results provided according to the first embodiment described above. That is, the flow controller 1 of the second embodiment features the means provided to correct the valve drive control information (V1) delivered to the laminated piezoelectric device 15 based on the flow rate test information computed by the flow rate test program P11.

Figure 11:
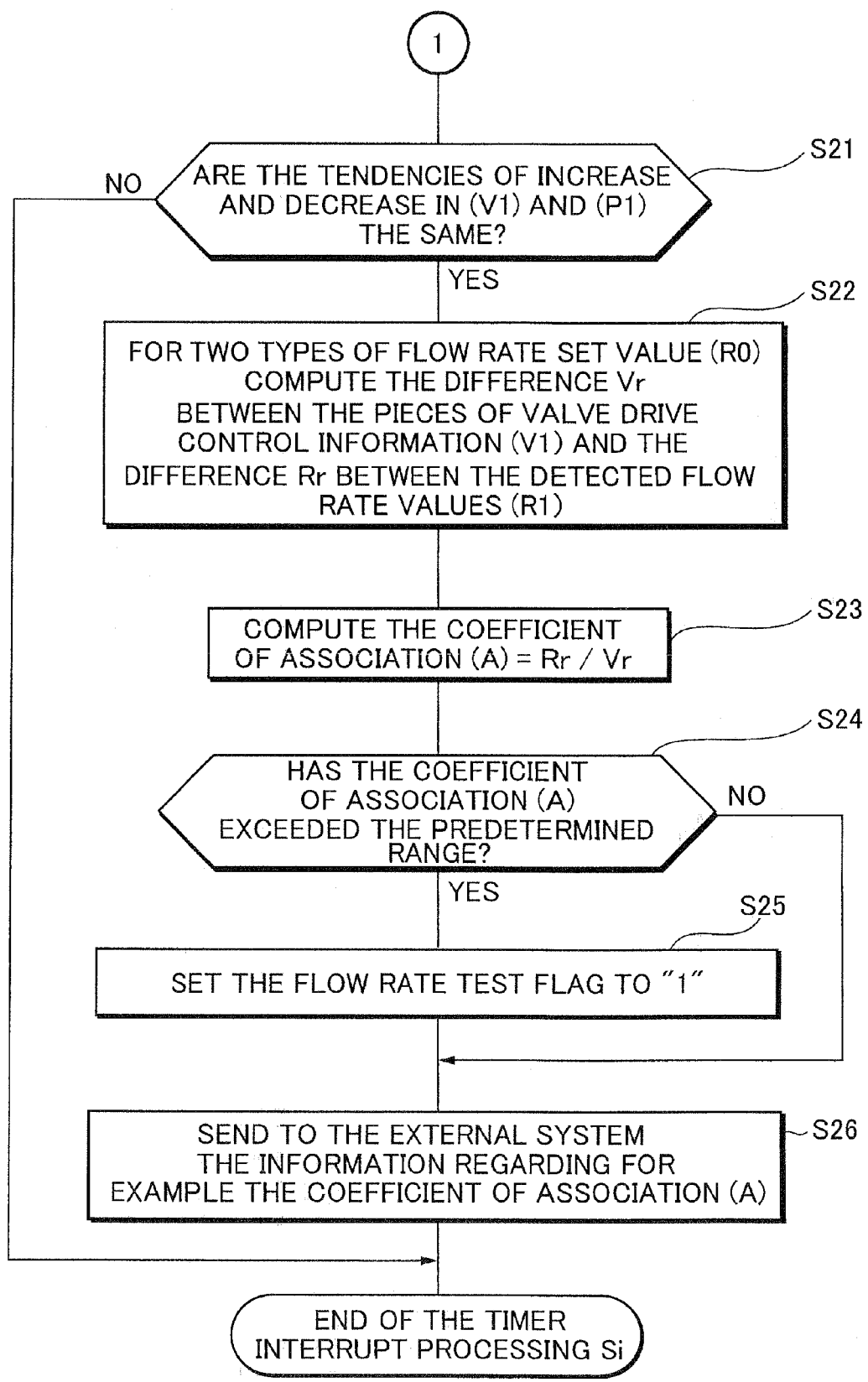
FIG. 11 is a flowchart according to the first embodiment showing similarly the procedure executed by the flow controller of the present invention to control flow rates and test the flow control.
Figure 12:
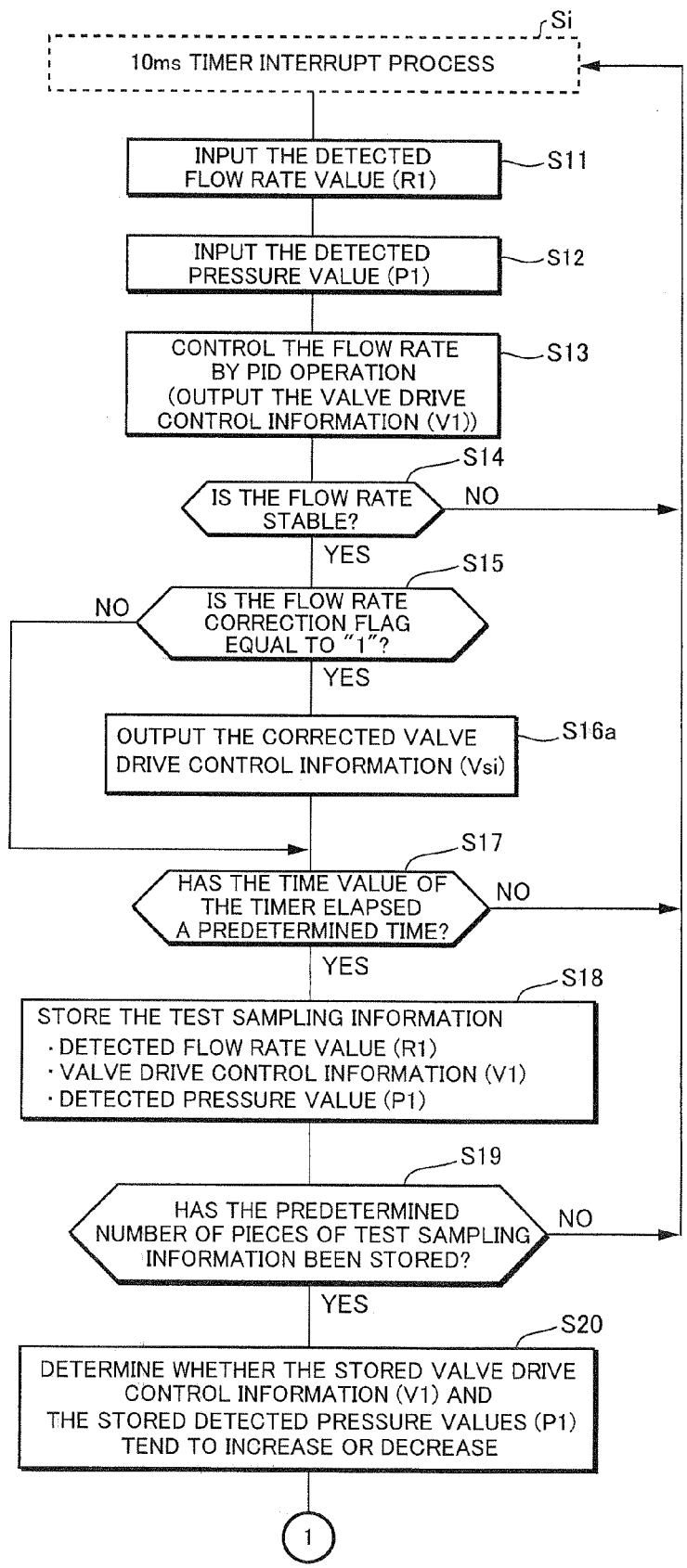
FIG. 12 is a flowchart according to a second embodiment showing similarly the procedure executed by the flow controller of the present invention to control flow rates and test the flow control.

FIG. 12 shows the procedure for flow rate control according to the second embodiment. The difference between the procedure according to the first embodiment shown in FIGS. 10 and 11 and that of the second embodiment lies in step S16 of the first embodiment shown in FIG. 10 (or step S16a of the second embodiment). Note that the contents of each step shown in FIG. 11 of the first embodiment are the same as those of the second embodiment. Furthermore, in FIGS. 10 and 12, those steps for performing the same contents of processing are numbered with the same step numbers.

Now, of the steps of the second embodiment shown in FIG. 12, a description will be given to step S16a (FIG. 12) which is not included in the first embodiment.

(Step S16a)

It was determined in the processing of step S24 above that there had occurred a non-negligible deviation in the flow rate through the fluid path 4 controlled by the flow controller 1 toward the flow rate set value (R0) received from the external system 9. Thus, the flow rate correction program P12 provides control to correct the flow rate to the flow rate set value (R0). The control for correcting the flow rate can be performed, for example, by following the procedures set forth in (1) and (2) below. The second embodiment is characterized by providing the control means for correcting flow rates.

(1) First, with reference to the valve property information table K1, the valve property information reference program P8 is used to determine the reference valve drive control information (valve drive voltage) (Vsi) associated with both the detected flow rate value (R1) and the detected pressure value (P1) at the current point in time, which were received in steps S11 and S12, respectively.

(2) The process provides control to deliver the valve drive control information (valve drive voltage) (Vsi) determined in the processing of (1) to the laminated piezoelectric device 15 as the corrected valve drive control information. That is, to apply the valve drive control information (Vsi) determined in (1) as above to the laminated piezoelectric device 15, the flow rate correction program P12 determines the valve drive signal S3 serving as the drive voltage value (the valve drive control information (V0)) to be delivered to the valve drive circuit 20, and then delivers the resulting valve drive control information (V0) to the valve drive circuit 20.

The control method for correcting flow rates set forth in (1) and (2) above is considered applicable when the coefficient of association (A) is determined to be out of a predetermined range because there has occurred no variations at one of the intersection points, for example, at P2, of the straight lines such as L1 shown in FIG. 16, but a variation has occurred at the other intersection P1.

On the other hand, such a method can also be employed in which a translation determination program is used to analyze whether the straight line such as L1 has been translated as shown in FIG. 17, and then provide control to correct the flow rate based on the results of the analysis. This method may be carried out as follows. That is, for example, the rate of change in the gradient of the straight line such as L1 (the coefficient of association (A)) is determined. Then, the valve drive control information determined by multiplying the not-yet correctedvalve drive control information (V1) delivered in step S13 by the rate of change may be delivered to the valve drive circuit 20.

Note that the valve drive control information (V1) is delivered through the processing of step S13 to the laminated piezoelectric device 15. That is, the processing of step S16a is executed in a very short period of time after the processing of step S13 has been performed, allowing the corrected valve drive control information (Vsi) to be applied to the laminated piezoelectric device 15. Thus, the flow rate through the fluid path 4 is to be controlled to the flow rate set value (R0).

In the second embodiment described above, while controlling the flow rate through the fluid path 4 towards the flow rate set value (R0), the process performs automatic testing on the accuracy of the flow control based on the test sampling information obtained through sampling once in a day, a few days, one week, or a few weeks. Furthermore, when it is determined as a result of the testing that there has occurred a non-negligible deviation in flow control with respect to the flow rate set value (R0) serving as a target, the valve drive control information (Vsi) is found to correct the flow rate through the fluid path 4, and then the valve drive control information (Vsi) is immediately applied to the laminated piezoelectric device 15.

Suppose that the flow controller 1 having the processing function of the second embodiment described above is introduced into the semiconductor manufacturing line. In this case, while the flow rate of the process gas to be supplied to the semiconductor manufacturing line is controlled, the accuracy of the flow control is automatically tested and control is also provided to correct the flow rate based on the test results. It is thus possible to improve the rate of operation of the semiconductor manufacturing line.

A description will now be made to a third embodiment of the present invention. In the second embodiment, the testing on the accuracy of flow control may be executed to determine that there has occurred a non-negligible deviation in flow control with respect to the flow rate set value (R0) serving as a target. In this context, the third embodiment allows the control means 8 of the flow controller 1 to transmit a control command to the external system 9 to acquire a permission to correct the flow rate. Then, as in the second embodiment, when a control command relating to the permission for the flow rate correction is received in response to the aforementioned control command, the control means 8 delivers the valve drive control information (Vsi) for correcting the flow rate through the fluid path 4 to the laminated piezoelectric device 15.

Figure 10:
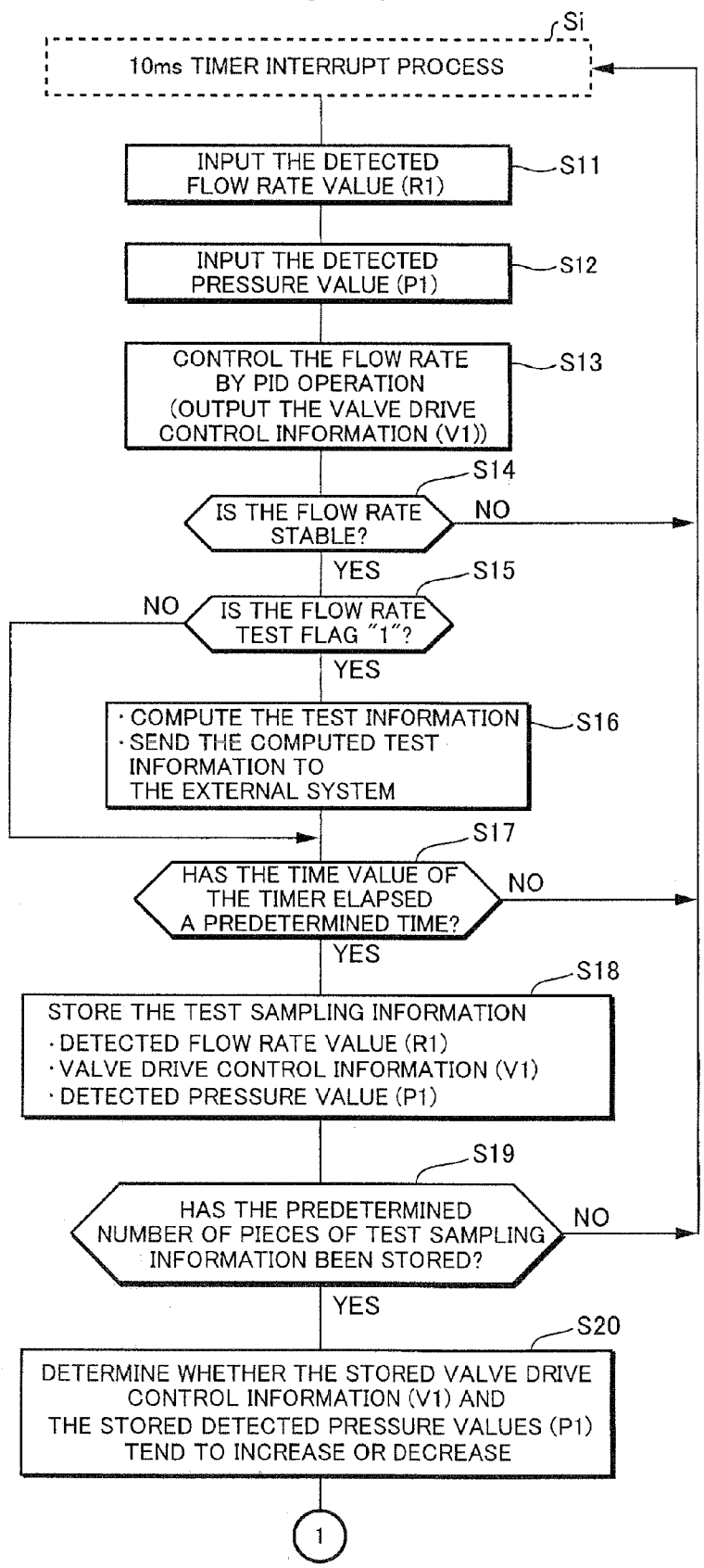
FIG. 10 is a flowchart according to a first embodiment showing the procedure executed by the flow controller of the present invention to control flow rates and test the flow control.

To implement the third embodiment, it is necessary to alter the procedure for communicating with the external system 9 shown in FIG. 9 and part of the contents of processing shown in FIG. 10 (or FIG. 12) and FIG. 11. Now, these altered contents of processing will be described below.

Figure 13:
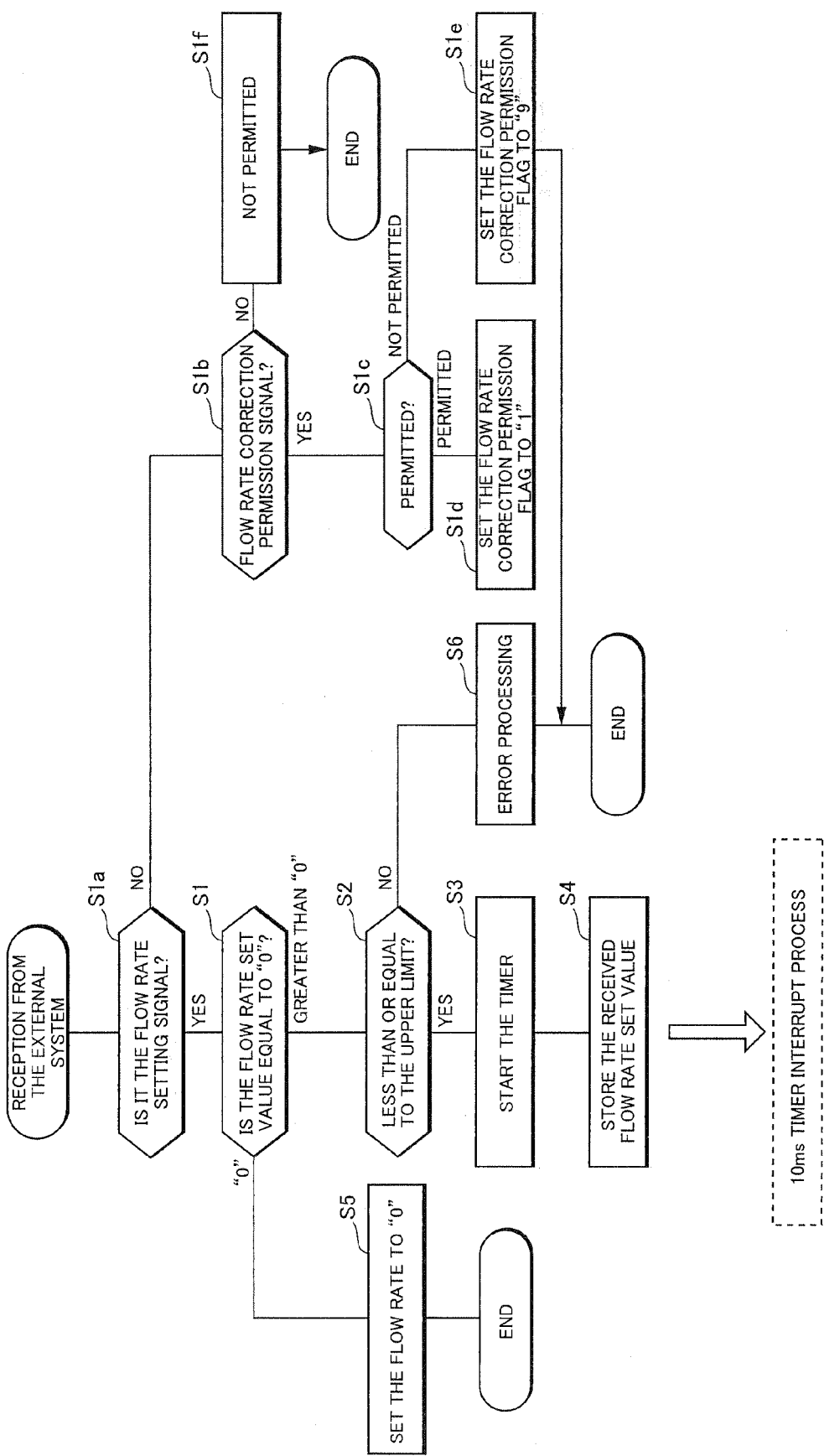
FIG. 13 is a flowchart showing an example of the sequence of reception steps executed by the control means when a control command signal is transmitted from the external system shown in FIG. 1 to the flow controller of the present invention.

FIG. 13 shows an example of reception processing performed when the flow controller 1 receives a control command or the like from the external system 9 to implement the third embodiment. In FIG. 13, the same processes as those of FIG. 9 are given the same step numbers, whereas newly added steps are provided with step numbers from step S1a to step S1f. Now, to implement the third embodiment, the contents of processing in the newly added steps S1a to S1f will be described.

(Step S1a)

When a control command is received from the external system, the type of the control command is determined. Then, if the control command is determined to be a flow rate setting signal, then the process proceeds to the processing of step S1 mentioned above. On the other hand, if the command is determined to be not the flow rate setting signal, then the process proceeds to step S1b.

(Step S1b)

It is determined whether the received control command is a signal indicative of a permission for flow rate correction. If the command is determined to be a signal relating to the permission for flow rate correction, then the process proceeds to step S1c. On the other hand, if it is determined that the command is not a signal relating to the permission for flow rate correction, then the process determines that a non-registered control command has been transmitted. Then, the process performs the error processing in step S1f and terminates the processing for receiving the external system 9.

(Step 1c), (Step 1d), and (Step 1e)

It is determined whether the received signal relating to the permission of flow rate correction is one indicative of "permitting". If the signal is determined to indicate "permitting", then in the processing of step S1d, a flow rate correction permission flag defined in the RAM 23 is set, for example, to "1". On the other hand, if the received signal relating to the flow rate correction permission is determined to be a signal indicative of "not-permitting", then the flow rate correction permission flag is set, for example, to "9" in the processing of step S1e.

Figure 14:
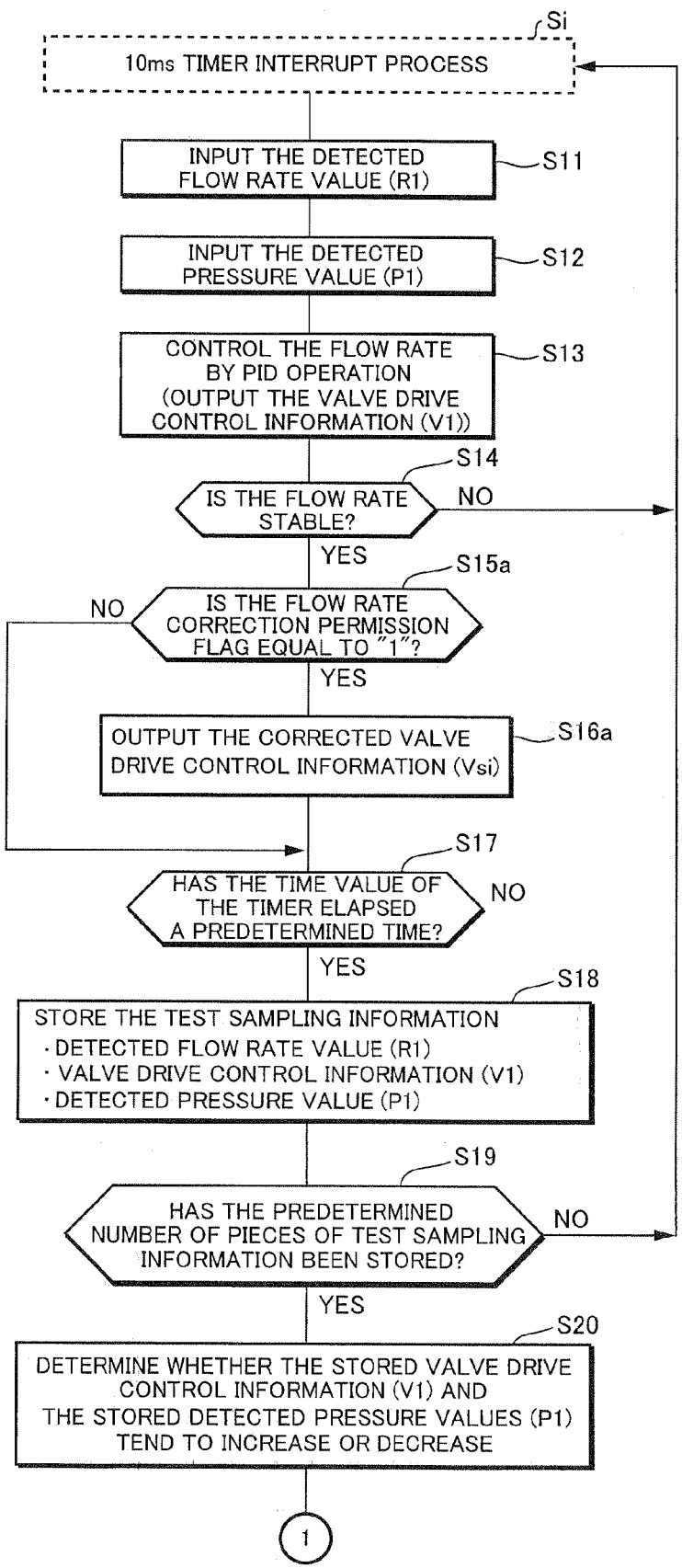
FIG. 14 is a flowchart according to a third embodiment showing the procedure executed by the flow controller of the present invention to control flow rates and test the flow control.
Figure 15:
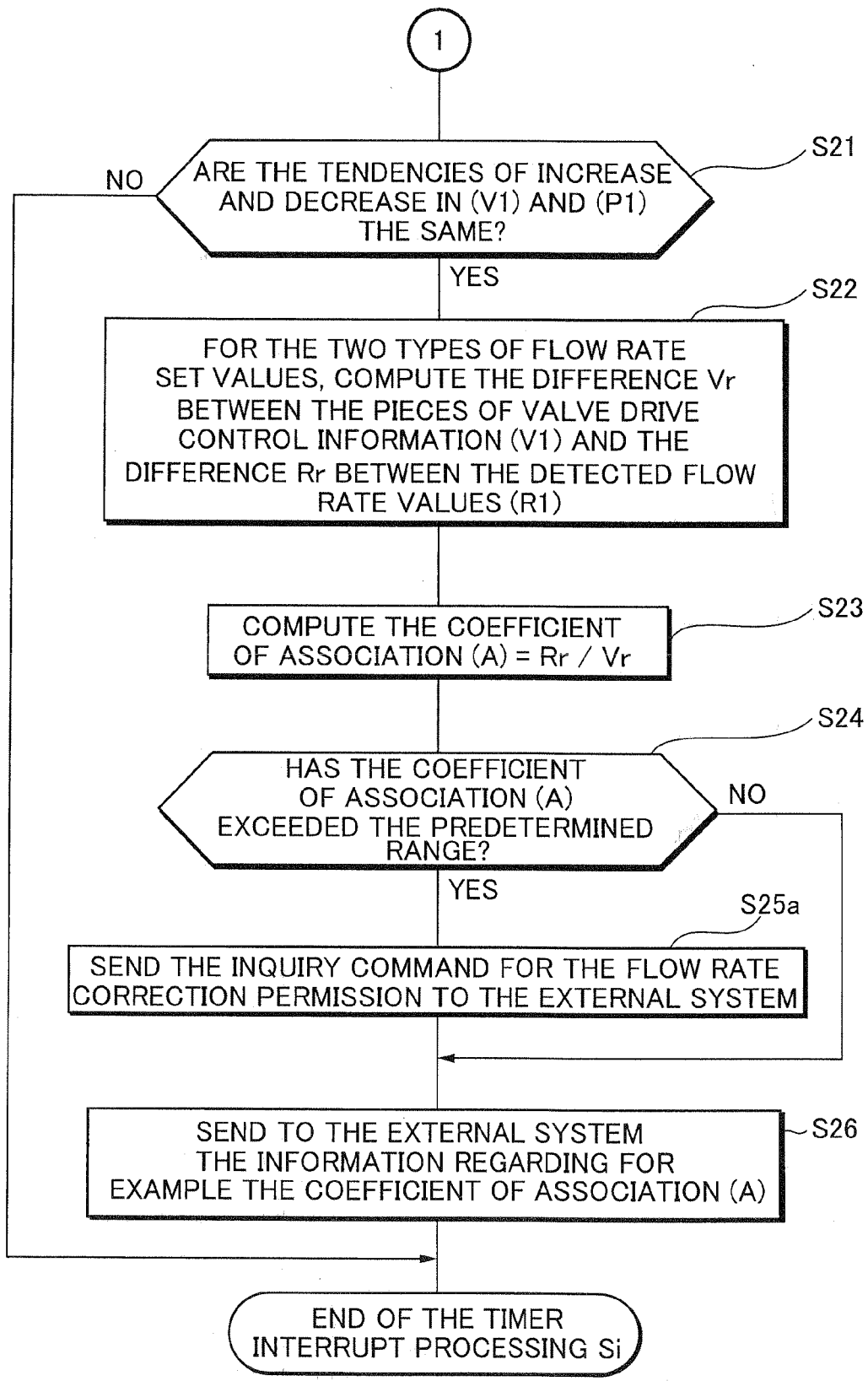
FIG. 15 is a flowchart according to the third embodiment showing similarly the procedure executed by the flow controller of the present invention to control the flow rate and test the flow control.

FIGS. 14 and 15 show the procedure of the timer interrupt processing Si for implementing the third embodiment. A description will now be made to steps S15a and S25a, in which the contents of processing shown in FIGS. 14 and 15 are different from those according to the second embodiment shown in FIGS. 11 and 12.

(Step S15*a*)

In step S15*a* shown in FIG. 14, it is determined whether the flow rate correction permission flag defined in the RAM 23 has been set to "1". If the flow rate correction permission flag has been set to "1", then this information indicates that the flowrate through the fluid path 4 is permitted to correct, and thus "1" is set in step S1*d* above. Then, if the flow rate correction permission flag is determined to have been set to "1", then the process proceeds to step S16*a* above to output the corrected valve drive control information (Vsi) to the laminated piezoelectric device 15. On the other hand, if the flow rate correction permission flag has been set to "9", then the process proceeds to step S17.

(Step S25*a*)

In the previous processing of step S24, testing on the accuracy of flow control was executed to determine that there has occurred a non-negligible deviation in flow control with respect to the flow rate set value (R0). Thus, in step S25*a* shown in FIG. 15, the process transmits to the external system 9 a control command to request for permission for correcting the flow rate through the fluid path 4.

When having received the control command relating to the flow rate correction permission from the flow controller 1 in the processing of step S25*a*, the external system 9 displays this information on a monitor device of the monitoring system included in the external system 9. Furthermore, the monitoring system also displays in real time the detected flow rate value (R1), the detected pressure value (P1), the valve drive control information (V1), and the test information, which are transmitted from the flow controller 1 to the monitor device. Then, viewing the display on the monitor device, the supervisor of the monitoring system inputs, for example, information regarding the "permitting of flow rate correction" or the "non-permitting of flow rate correction" at input means such as the keyboard. This input signal is transmitted to the flow controller 1 as a communication interrupt signal, so that the main control program Pm of the flow controller 1 performs the processing shown in FIG. 14.

In the third embodiment of the present invention described above, when testing on the accuracy of flow control is executed and it is determined that a non-negligible deviation has occurred in the flow control with respect to the flow rate set value (R0), the process transmits an inquiry control command for the permission of flow rate correction to the external system 9. Then, the process performs the flow rate correction after having received a command relating to the correction permission which the supervisor or the like at the external system 9 has decided to enter. It is thus possible to correct the flow rate at appropriate timing.

In the embodiments of the present invention described above, for flow rate set values (R0) received from the external system 9, i.e., for deposition for one batch, a plurality of pieces of test sampling information may be sampled and then stored in the test information sampling tables such as K2 and K3. In this case, a plurality of pieces of valve drive control information (V1), detected flow rate values (R1), and detected pressure values (P1) which constitute the plurality of pieces of test sampling information, may be each averaged using an average value computation program P7*a*. Then, each of the resulting average values may be employed as the valve drive control information (V1), the detected flow rate value (R1), and the detected pressure value (P1), which are associated with the received flow rate set values (R0) corresponding to the one batch.

On the other hand, to compute the aforementioned average values, the maximum and minimum values may be excluded from the plurality of pieces of valve drive control information (V1), the plurality of detected flow rate values (R1), and the plurality of detected pressure values (P1), respectively, in computing their average values. This way of computing average values makes it possible to avoid the adverse effects that abnormal values such as the valve drive control information (V1) have.

In the embodiments of the present invention described above, such an example has been described in which the thrust generation means for activating the actuator of the flow control valve mechanism 7 is realized as the laminated piezoelectric device 15. However, the invention is not limited thereto. The thrust generation means can also be implemented as electromagnetic thrust generation means employing electromagnetic force, for example, an actuator made up of a solenoid valve. Employing the electromagnetic actuator requires for the control means 8 to deliver an appropriate range of electric current values (the valve drive control information (V0)) to the valve drive circuit 20 in order to control its thrust.

Furthermore, in the embodiments of the flow controller of the present invention described above, such an example has been explained in which the process gas is supplied to the semiconductor manufacturing apparatus. However, the present invention is also applicable to the flow rate control of liquid passing through the fluid path.

While there has been described what are at present considered to be preferred embodiments of the present invention, it will be understood that various modifications may be made thereto, and it is intended that the appended claims cover all such modifications as fall within the true spirit of the invention.

What is claimed is:

1. A flow controller comprising:
   flow rate detection means for detecting a flow rate of a fluid passing through a fluid path;
   a flow control valve mechanism, provided in said fluid path, for controlling said flow rate by regulating valve opening in accordance with valve drive control information; and
   control means for receiving at least one type of a flow rate set value from an external system and delivering said valve drive control information to said flow control valve mechanism to control said valve opening so as to adjust said flow rate through the fluid path to said received flow rate set value, wherein
   when said fluid is allowed to flow through said fluid path in advance to deliver said valve drive control information serving as a reference to said flow control valve mechanism, information indicative of a relationship between said reference valve drive control information and a detected flow rate value serving as a reference and detected by said flow rate detection means is associated with a detected pressure value of said fluid and stored as valve property information in storage means of said control means, and wherein
   when said control means is receiving a new flow rate set value (R0) from said external system, and delivering to said flow control valve mechanism said valve drive control information determined based on a detected flow rate value received from said flow rate detection means at predetermined time intervals, thereby providing a control to adjust said flow rate to said flow rate set value (R0) said control means includes test information sampling means for allowing test sampling information to be associated with said flow rate set value (R0) and stored in said storage means, said test sampling information including, for each of said newly received flow rate set values (R0), said detected flow rate value (R1) received from said flow rate detection means; a detected pressure value (P1) of said fluid made available upon receiving said detected flow rate value (R1); and valve drive control information (V1) determined based on said detected flow rate value (R1) and delivered to said flow control valve mechanism, valve control information gradient computation means for sequentially determining, in relation to a predetermined number of pieces of said test sampling information associated with said flow rate set value (R0) and stored in said storage means, a coefficient of association (A) from said detected flow rate value (R1) and said valve drive control information (V1) corresponding to each other in their temporal sequence of storage, the coefficient of association (A) indicating an association of said detected flow rate value (R1) and said valve drive control information (V1) constituting said test sampling information, and flow rate test means for determining a valve control difference as test information on flow control after executing said valve control information gradient computation means, the valve control difference being a difference between new valve drive control information (V1) determined based on a newly received detected flow rate value (R1) and valve drive control information serving as a reference, the valve drive control information being determined with reference to said valve property information and associated with both said newly received detected flow rate value (R1) and a newly received detected pressure value (P1).

2. The flow controller according to claim 1, wherein said valve control information gradient computation means comprises first gradient computation means for determining said coefficient of association (A) as a gradient of a straight line connecting between intersection point coordinates defined by associating said detected flow rate value (R1) and said valve drive control information (V1) in their temporal sequence of storage with two-dimensional coordinate axes, respectively, said detected flow rate value (R1) and said valve drive control information (V1) constituting said test sampling information associated with any two types of said flow rate set value.

3. The flow controller according to claim 1, wherein said valve control information gradient computation means comprises second gradient computation means for determining said coefficient of association (A) as a gradient of a straight line connecting between origin coordinates and intersection point coordinates defined by associating said detected flow rate value (R1) and said valve drive control information (V1) in their temporal storage sequence with two-dimensional coordinate axes, respectively, said detected flow rate value (R1) and said valve drive control information (V1) constituting said test sampling information associated with any one type of said flow rate set value.

4. The flow controller according to claim 1, wherein said test information sampling means comprises means for allowing one piece of said test sampling information to be associated with each of said newly received flow rate set values (R0) and stored in said storage means in association with said flow rate set value (R0) and for allowing said test sampling information to be associated with said flow rate set value (R0) and stored in said storage means until a predetermined upper limit number of storage entries is reached.

5. The flow controller according to claim 1, wherein said test information sampling means comprises means for allowing a plurality of pieces of said test sampling information to be associated with each of said newly received flow rate set values (R0) and stored in said storage means in association with said flow rate set value (R0) and for allowing said test sampling information to be associated with said flow rate set value (R0) and stored in said storage means until a predetermined upper limit number of storage entries is reached.

6. The flow controller according to claim 1, wherein said flow rate test means comprises second flow rate test means for determining a flow rate difference as test information regarding flow control when said new valve drive control information (V1) is delivered, the flow rate difference being a difference between said new detected flow rate value (R1) and a detected flow rate value serving as a reference, the detected flow rate value being associated with both said new valve drive control information (V1) determined with reference to said valve property information and a new detected pressure value (P1) made available upon reception of said detected flow rate value (R1).

7. The flow controller according to claim 1, wherein:
said control means comprises means for determining whether a value of said coefficient of association (A) computed sequentially by said valve control information gradient computation means is out of a range of predetermined threshold values; and
when the value of said coefficient of association (A) is determined to be out of said range of the threshold values, said control means provides control to execute said flow rate test means.

8. The flow controller according to claim 1, wherein:
said control means comprises flow rate correction means for determining valve drive control information serving as a reference and determined with reference to said valve property information, after delivery of said new valve drive control information (V1) determined based on a newly received detected flow rate value (R1), said valve drive control information being associated with both said newly received detected flow rate value (R1) and said newly received detected pressure value (P1); and
said control means delivers said valve drive control information serving as a reference and determined by said flow rate correction means to said flow control valve mechanism.

9. The flow controller according to claim 1, wherein:
said control means comprises test sampling information increase/decrease tendency determination means for determining, in relation to a predetermined number of pieces of said valve drive control information (V1) and said detected pressure values (P1) together constituting said test sampling information associated with any two types of said flowrate set value, whether a differential value (Sv) between neighboring pieces of said valve drive control information (V1) in their temporal sequence of storage is positive or negative and similarly whether a differential value (Pv) between said detected pressure values (P1) is positive or negative; and
when both said differential value (Sv) and said differential value (Pv) are all determined to be "positive" or "negative", said control means executes said valve control information gradient computation means.

10. The flow controller according to claim 1, wherein:
said control means comprises flow rate correction inquiry means, the flow rate correction inquiry means having means for transmitting to said external system an inquiry control command relating to an inquiry about whether a flow rate through said fluid path is permitted to be corrected and another means for receiving a response to said inquiry control command, said transmission and reception being carried out after executing said flow rate test means; and after receiving a control command related to a permission of flow rate correction as a response to said inquiry control command, said control means executes said flow rate correction means.

11. A test method for a flow controller, the flow controller including flow rate detection means for detecting a flow rate of a fluid passing through a fluid path, a flow control valve mechanism, provided in said fluid path, for controlling said flow rate by regulating valve opening in accordance with valve drive control information, and control means for receiving at least one type of a flow rate set value from an external system and delivering said valve drive control information to said flow control valve mechanism to control said valve opening so as to adjust said flow rate through said fluid path to said received flow rate set value, the method comprising:

a step to be carried out when said fluid is allowed to flow through said fluid path in advance to deliver said valve drive control information serving as a reference to said flow control valve mechanism, said step being executed for storing information, indicative of a relationship between said reference valve drive control information and a detected flow rate value serving as a reference and detected by said flow rate detection means, in storage means of said control means as valve property information in association with a detected pressure value of said fluid;

a test information sampling step to be carried out when said control means is receiving a new flow rate set value (R0) from said external system, and delivering to said flow control valve mechanism said valve drive control information determined based on a detected flow rate value received from said flow rate detection means at predetermined time intervals, thereby providing control to adjust said flow rate to said flow rate set value (R0), this step being executed to allowing test sampling information to be associated with said flow rate set value (R0) and stored in said storage means, the test sampling information being comprised, for each of said newly received flow rate set values (R0), of said detected flow rate value (R1) received from said flow rate detection means, a detected pressure value (P1) of said fluid made available upon reception of said detected flow rate value (R1), and valve drive control information (V1) determined based on said detected flow rate value (R1) and delivered to said flow control valve mechanism;

a valve control information gradient computation step to carried be out on a predetermined number of pieces of said test sampling information associated with said flow rate set value (R0) and stored in said storage means, the step being executed for sequentially determining a coefficient of association (A) from said detected flow rate value (R1) and said valve drive control information (V1) corresponding to each other in their temporal sequence of storage, the coefficient of association (A) indicating an association of said detected flow rate value (R1) and said valve drive control information (V1) together constituting said test sampling information; and a flow rate test step to be carried out after executing said valve control information gradient computation step, for determining a valve control difference as test information regarding flow control, said valve control difference being a difference between new valve drive control information (V1) determined based on a newly received detected flow rate value (R1) and valve drive control information serving as a reference, the reference valve drive control information being determined with reference to said valve property information and associated with both said newly received detected flow rate value (R1) and a newly received detected pressure value (P1).

12. The test method for a flow controller according to claim 11, wherein said valve control information gradient computation step includes a first gradient computation step for determining said coefficient of association (A) as a gradient of a straight line connecting between intersection point coordinates defined by associating said detected flow rate value (R1) and said valve drive control information (V1) in their temporal sequence of storage with two-dimensional coordinate axes, respectively, said detected flow rate value (R1) and said valve drive control information (V1) constituting said test sampling information associated with any two types of said flow rate set value.

13. The test method for a flow controller according to claim 11, wherein said valve control information gradient computation step includes a second gradient computation step for determining said coefficient of association (A) as a gradient of a straight line connecting between origin coordinates and intersection point coordinates defined by associating said detected flow rate value (R1) and said valve drive control information (V1) in their temporal sequence of storage with two-dimensional coordinate axes, respectively, said detected flow rate value (R1) and said valve drive control information (V1) constituting said test sampling information associated with any one type of said flow rate set value.

14. The test method for a flow controller according to claim 11, wherein said test information sampling step includes a sub-step for allowing one piece of said test sampling information to be associated with each of said newly received flow rate set values (R0) and stored in said storage means in association with said flow rate set value (R0) and for allowing said test sampling information to be associated with said flow rate set value (R0) and stored in said storage means until a predetermined upper limit number of storage entries is reached.

15. The test method for a flow controller according to claim 11, wherein said test information sampling step includes a sub-step for allowing a plurality of pieces of said test sampling information to be associated with each of said newly received flow rate set values (R0) and stored in said storage means in association with said flow rate set value (R0) and for allowing said test sampling information to be associated with said flow rate set value (R0) and stored in said storage means until a predetermined upper limit number of storage entries is reached.

16. The test method for a flow controller according to claim 11, wherein said flow rate test step includes a second flow rate test step for determining a flow rate difference as test information regarding flow control when said new valve drive control information (V1) is delivered, the flow rate difference being a difference between said new detected flow rate value (R1) and a detected flow rate value serving as a reference, the detected reference flow rate value being associated with both said new valve drive control information (V1) determined with reference to said valve property information and a new detected pressure value (P1) made available upon reception of said detected flow rate value (R1).

17. The test method for a flow controller according to claim 11, further comprising a step for determining whether a value of said coefficient of association (A) computed sequentially by said valve control information gradient computation step is out of a range of predetermined threshold values, and wherein when the value of said coefficient of association (A) is determined to be out of said range of the threshold values, said flow rate test step is executed.

18. The test method for a flow controller according to claim 11, further comprising a test sampling information increase/decrease tendency determination step to be carried out on a predetermined number of pieces of said valve drive control information (V1) and said detected pressure value (P1) constituting said test sampling information associated with any two types of said flow rate set value, the step being executed for determining whether a differential value (Sv) between neighboring pieces of said valve drive control information (V1) in their temporal sequence of storage is positive or negative and similarly whether a differential value (Pv) between said detected pressure values (P1) is positive or negative, and wherein when both said differential value (Sv) and said differential value (Pv) are all determined to be "positive" or "negative", said valve control information gradient computation step is executed.

19. A method for enabling a flow controller to control a flow rate through a fluid path, the flow controller including flow rate detection means for detecting a flow rate of the fluid passing through the fluid path, a flow control valve mechanism, provided in said fluid path, for controlling said flow rate by regulating valve opening in accordance with valve drive control information, and control means for receiving at least one type of a flow rate set value from an external system and delivering said valve drive control information to said flow control valve mechanism to control said valve opening so as to adjust said flow rate through said fluid path to said received flow rate set value, the method comprising:

a step to be carried out when said fluid is allowed to flow through said fluid path in advance to deliver said valve drive control information serving as a reference to said flow control valve mechanism, the step being executed for storing information, indicative of a relationship between said reference valve drive control information and a detected flow rate value serving as a reference and detected by said flow rate detection means, in storage means of said control means as valve property information in association with a detected pressure value of said fluid;

a test information sampling step to be carried out when said control means is receiving a new flow rate set value (R0) from said external system, and delivering to said flow control valve mechanism said valve drive control information determined based on a detected flow rate value received from said flow rate detection means at predetermined time intervals, thereby providing a control to adjust said flow rate to said flow rate set value (R0), said step allowing test sampling information to be associated with said flow rate set value (R0) and stored in said storage means, said test sampling information including, for each of said newly received flow rate set values (R0), i) said detected flow rate value (R1) received from said flow rate detection means, ii) a detected pressure value (P1) of said fluid made available upon reception of said detected flow rate value (R1), and iii) valve drive control information (V1) determined based on said detected flow rate value (R1) and delivered to said flow control valve mechanism;

a valve control information gradient computation step to be carried out on a predetermined number of pieces of said test sampling information associated with said flow rate set value (R0) and stored in said storage means, said step being executed for sequentially determining a coefficient of association (A) from said detected flow rate value (R1) and said valve drive control information (V1) corresponding to each other in their temporal sequence of storage, the coefficient of association (A) indicating an association of said detected flow rate value (R1) and said valve drive control information (V1) constituting said test sampling information;

a flow rate correction step to be carried out after a value of said coefficient of association (A) computed sequentially in said valve control information gradient computation step is determined to be out of a range of predetermined threshold values and new valve drive control information (V1) determined based on a newly received detected flow rate value (R1) is delivered, said step being then executed for determining valve drive control information, serving as a reference, determined with reference to said valve property information and associated with both said newly received detected flow rate value (R1) and a newly received detected pressure value (P1); and a step for delivering to said flow control valve mechanism said valve drive control information serving as a reference and determined in said flow rate correction step.

20. The flow control method for a flow controller according to claim 19, wherein said valve control information gradient computation step includes a first gradient computation step for determining said coefficient of association (A) as a gradient of a straight line connecting between intersection point coordinates defined by associating said detected flow rate value (R1) and said valve drive control information (V1) in a temporal sequence of their storage with two-dimensional coordinate axes, respectively, said detected flow rate value (R1) and said valve drive control information (V1) constituting said test sampling information associated with any two types of said flow rate set value.

21. The flow control method for a flow controller according to claim 19, wherein said valve control information gradient computation step includes a second gradient computation step for determining said coefficient of association (A) as a gradient of a straight line connecting between origin coordinates and intersection point coordinates defined by associating said detected flow rate value (R1) and said valve drive control information (V1) in a temporal sequence of their storage with two-dimensional coordinate axes, respectively, said detected flow rate value (R1) and said valve drive control information (V1) constituting said test sampling information associated with any one type of said flow rate set value.

22. The flow control method for a flow controller according to claim 19, wherein said test information sampling step includes a sub-step for allowing one piece of said test sampling information to be associated with each of said newly received flow rate set values (R0) and stored in said storage means in association with said flow rate set value (R0) and for allowing said test sampling information to be associated with said flow rate set value (R0) and stored in said storage means until a predetermined upper limit number of storage entries is reached.

23. The flow control method for a flow controller according to claim 19, wherein said test information sampling step includes a sub-step for allowing a plurality of pieces of said test sampling information to be associated with each of said newly received flow rate set values (R0) and stored in said storage means in association with said flow rate set value (R0) and for allowing said test sampling information to be associated with said flow rate set value (R0) and stored in said storage means until a predetermined upper limit number of storage entries is reached.

24. The flow control method for a flow controller according to claim 19, further comprising a test sampling information increase/decrease tendency determination step carried out on a predetermined number of pieces of said valve drive control information (V1) and said detected pressure value (P1) constituting said test sampling information associated with any two types of said flow rate set value, said step being executed for determining whether a differential value (Sv) between neighboring pieces of said valve drive control information (V1) in their temporal sequence of storage is positive or negative and similarly whether a differential value (Pv) between said detected pressure values (P1) is positive or negative, and wherein when both said differential value (Sv) and said differential value (Pv) are all determined to be "positive" or "negative", said valve control information gradient computation step is executed.

* * * * *